(12) United States Patent
Choi et al.

(10) Patent No.: US 9,325,782 B2
(45) Date of Patent: Apr. 26, 2016

(54) INFORMATION PROVIDING APPARATUS AND METHOD THEREOF

(71) Applicant: LG Electronics Inc., Seoul (KR)

(72) Inventors: Sungha Choi, Seoul (KR); Kgiwung Ryoo, Seoul (KR); Kwanghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 14/144,176

(22) Filed: Dec. 30, 2013

(65) Prior Publication Data

US 2014/0307040 A1    Oct. 16, 2014

(30) Foreign Application Priority Data

Apr. 10, 2013  (KR) .................. 10-2013-0039390
Apr. 11, 2013  (KR) .................. 10-2013-0040068

(51) Int. Cl.
*H04N 7/14* (2006.01)
*H04L 29/08* (2006.01)
*H04W 4/04* (2009.01)
*H04W 4/18* (2009.01)

(52) U.S. Cl.
CPC ............. *H04L 67/10* (2013.01); *H04N 7/141* (2013.01); *H04W 4/046* (2013.01); *H04W 4/18* (2013.01)

(58) Field of Classification Search
USPC ............. 348/14.03, 14.04; 455/569.2, 575.9
See application file for complete search history.

(56) References Cited

U.S. PATENT DOCUMENTS

2006/0031387 A1*  2/2006  Hamzeh .............. G06F 9/44526
                                                                    709/217
2012/0324482 A1   12/2012  Park
2013/0157647 A1*  6/2013  Kolodziej ......... H04M 1/72522
                                                                    455/419

OTHER PUBLICATIONS

Netflix, Inc., "Discovery and Launch Protocol Specification (DIAL) Version 1.6.4," XP055076322, Dec. 2012, 16 pages.
Bose, et al., "Terminal Mode—Transforming Mobile Devices into Automotive Application Platforms," Proceedings of the 2nd International Conference on Automotive User Interfaces and Interactive Vehicular Applications, XP055083625, Jan. 2010, pp. 148-155.
European Patent Office Application Serial No. 14152792.9, Search Report dated Mar. 6, 2015, 11 pages.
Discovery and Launch protocol specification (DIAL) Version 1.6.4, XP055076322, Dec. 2012, 16 pages.
European Patent Office Application Serial No. 14152792.9, Search Report dated Sep. 25, 2014, 6 pages.

* cited by examiner

*Primary Examiner* — Olisa Anwah
(74) *Attorney, Agent, or Firm* — Lee, Hong, Degerman, Kang & Waimey

(57) ABSTRACT

The present disclosure relates to an information providing apparatus and a method thereof capable of easily and effectively sharing (providing) information (for example, content, data, etc.) between a plurality of terminals, and an information providing apparatus according to the embodiments of the present disclosure may include a controller configured to execute an application program based on application program information contained in meta data, and process data contained in the meta data through the application program.

19 Claims, 22 Drawing Sheets

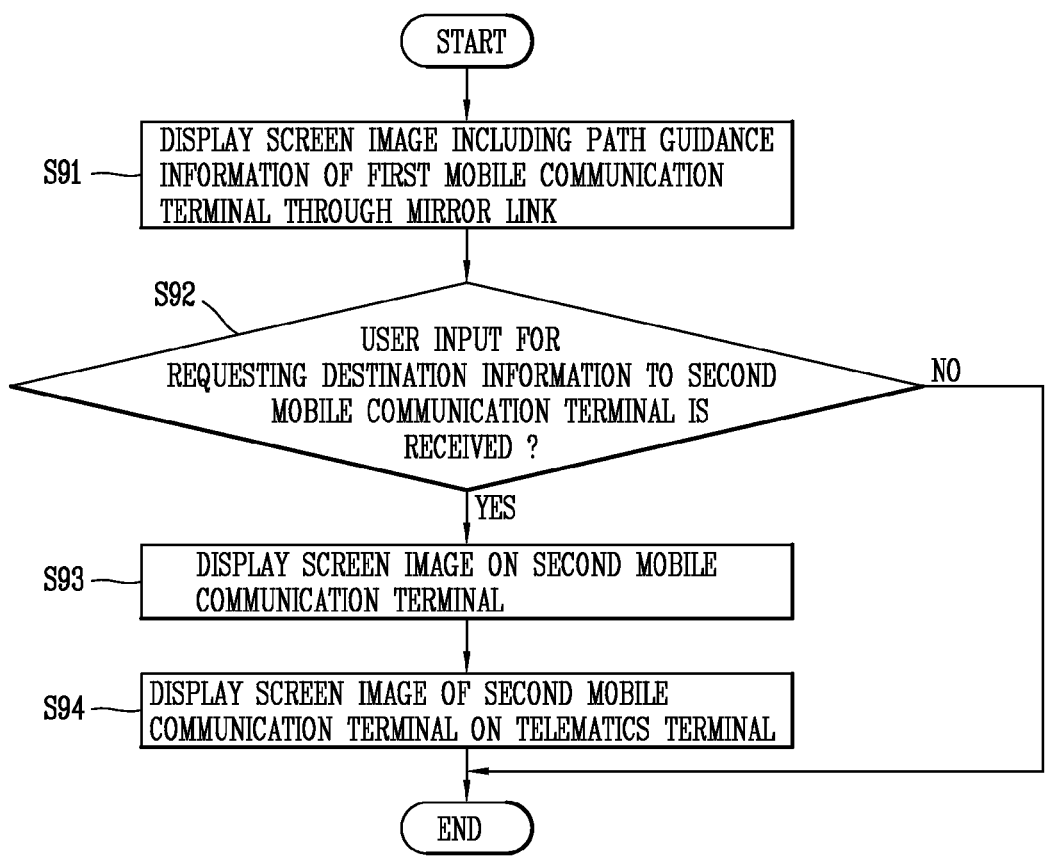

INFORMATION PROVIDING APPARATUS AND METHOD THEREOF

CROSS-REFERENCE TO RELATED APPLICATIONS

Pursuant to 35 U.S.C. §119(a), this application claims the benefit of earlier filing date and right of priority to Korean Application Nos. 10-2013-0039390 and 10-2013-0040068, filed on Apr. 10, 2013 and Apr. 11, 2013, respectively, the contents of which is incorporated by reference herein in its entirety.

BACKGROUND OF THE INVENTION

1. Field of the Invention

The present disclosure relates to an information providing apparatus and a method thereof.

2. Description of the Related Art

In general, an information providing apparatus according to the related art may be applicable to various devices such as a mobile terminal, a notebook computer, a television and the like, and provide various information such as a television broadcast program, voice information and the like to a user.

SUMMARY OF THE INVENTION

An information providing apparatus according to the embodiments of the present disclosure may include a communication unit configured to receive first meta data from a mobile communication terminal; a controller configured to execute an application program corresponding to application program information based on the application program information contained in the first meta data, and process data contained in the first meta data through the executed application program; and an output unit configured to output the processed data.

As an example associated with the present invention, the first meta data may include location information of the data; application program information configured to process the data; and format information configured to indicate a format of the data.

As an example associated with the present invention, the controller may display a website on the display unit, and generate second meta data including text data contained in the website, the information of the application program for reading the text data, and format information indicating the text data upon receiving a user input for requesting to transmit the website to the mobile communication terminal, and transmit the second meta data to the mobile communication terminal through the communication unit.

As an example associated with the present invention, the controller may generate second meta data including information associated with audio-based content, and transmit the second meta data to the mobile communication terminal upon receiving a user input for requesting to transmit the audio-based content to the mobile communication terminal while outputting the audio-based content.

As an example associated with the present invention, the controller may automatically retrieve information associated with audio-based content contained in the first meta data, and display the retrieved information on the display unit.

As an example associated with the present invention, the controller may generate second meta data for controlling a home network device and transmit the second meta data to the mobile communication terminal when a current location is near the destination.

As an example associated with the present invention, when a video call mode is requested while placing a call in a state that a vehicle is driven, the controller may generate second meta data for a video call, and transmit the second meta data to the mobile communication terminal so as to perform the video call in the mobile communication terminal.

As an example associated with the present invention, the second meta data may include information associated with an application program for performing the video call; and request information configured to request the execution of the application program for performing the video call.

As an example associated with the present invention, when a user input for performing a video call through the mobile communication terminal is received along with a video call mode request while placing a call, the controller may generate second meta data for the video call, and transmit the second meta data to the mobile communication terminal so as to perform the video call in the mobile communication terminal.

As an example associated with the present invention, when an image including location information is selected, and a user input for requesting to transmit the location information as destination information to the mobile communication terminal is received, the controller may generate second meta data including the location information and request information for requesting to set the location information to a destination, and transmit the second meta data to the mobile communication terminal through the communication unit.

As an example associated with the present invention, the controller may generate second meta data for requesting a point of interest (POI) around the destination based on a user input, and transmit the second meta data to the mobile communication terminal, and receive third meta data for requesting to set the location of the POI around the destination to a new destination from the mobile communication terminal, and automatically set the location of the POI around the destination contained in the third meta data to a new destination.

An information providing apparatus according to the embodiments of the present disclosure may include a display unit; a communication unit configured to receive a mirroring request and characteristic information of the mobile communication terminal from the mobile communication terminal through a mirror link; and a controller configured to determine a screen image to be displayed on the mobile communication terminal based on the characteristic information, and display the determined screen image on the display unit and the mobile communication terminal.

An information providing method according to the embodiments of the present disclosure may include receiving first meta data from a mobile communication terminal; executing an application program corresponding to application program information based on the application program information contained in the first meta data; and processing data contained in the first meta data through the application program; and outputting the processed data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 22 is a flow chart illustrating an information providing method according to a ninth embodiment of the present disclosure.

DETAILED DESCRIPTION OF THE INVENTION

Figure 1:
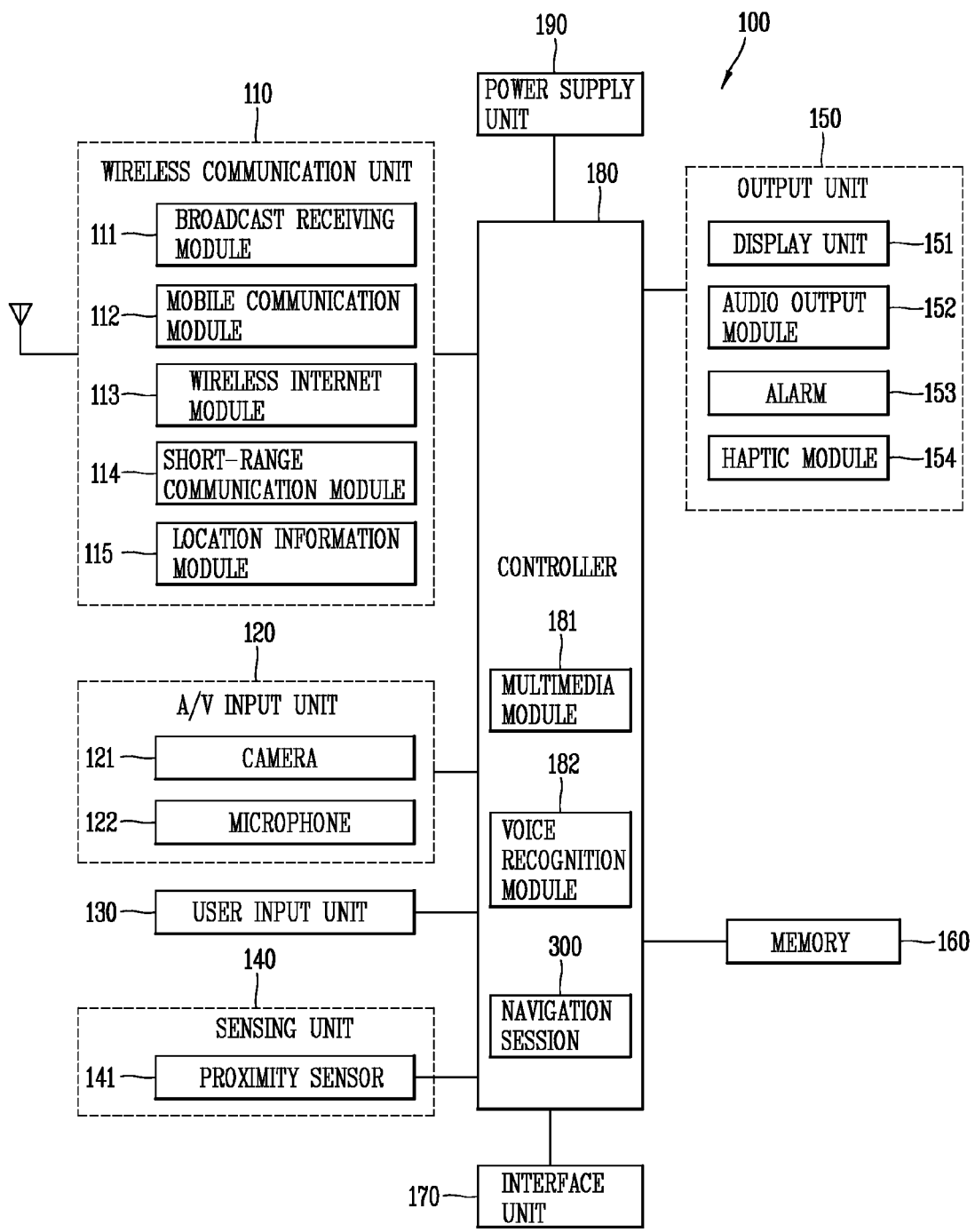
FIG. 1 is a block diagram illustrating the configuration of a mobile communication terminal for explaining the embodiments of the present disclosure.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments according to the present disclosure will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

FIG. 1 is a block diagram illustrating the configuration of a mobile communication terminal 100 for explaining embodiments of the present disclosure. The mobile communication terminal 100 may include a portable phone, a smart phone, a notebook computer, a digital broadcast terminal, a personal digital assistant (PDA), a portable multimedia player (PMP), and the like.

As illustrated in FIG. 1, the mobile communication terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. All the elements of the mobile communication terminal 100, as illustrated in FIG. 1, are not necessarily required, and therefore, the mobile communication terminal 100 may be implemented with a larger or smaller number of elements than those as illustrated in FIG. 1.

The wireless communication unit 110 typically includes one or more elements allowing radio communication between the mobile communication terminal 100 and a wireless communication system, or allowing radio communication between the mobile communication terminal 100 and a network in which the mobile communication terminal 100 is located to be carried out. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may denote a server that generates and transmits a broadcast signal and/or broadcast associated information or a server that receives a previously generated broadcast signal and/or broadcast associated information and transmits it to the mobile communication terminal 100. The broadcast associated information may denote information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, WiBro (Wireless Broadband), WiMax (World Interoperability for Microwave Access), HSDPA (High Speed Downlink Packet Access), and the like.

The short-range communication module 114 means a module for supporting a short-range communication. Here, it may be used a short-range communication technology including Bluetooth, Radio Frequency Identification (RFID), Infrared Data Association (IrDA), Ultra Wideband (UWB), ZigBee, and the like.

The location information module 115 is a module for checking or acquiring a location of the mobile terminal. A GPS module is an example. The GPS module receives location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system may be applicable thereto.

The A/V (audio/video) input unit 120 receives an audio or video signal, and the NV (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 (or other storage medium) or transmitted through the wireless communication unit 110. Two or more cameras 121 may be provided according to the configuration type and/or use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format capable of being transmitted to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal. The user input unit 130 may be configured by including a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 detects a current status of the mobile communication terminal 100 such as an opened or closed state of the mobile communication terminal 100, a location of the mobile communication terminal 100, the presence or absence of user contact, an orientation of the mobile communication terminal 100, an acceleration or deceleration movement of the mobile communication terminal 100, and the like, and generates a sensing signal for controlling the operation of the mobile communication terminal 100. For example, when the mobile communication terminal 100 is a slide phone type, it may sense an opened or closed state of the slide phone. Furthermore, the sensing unit 140 takes charge of a sensing function associated with whether or not power is supplied from the power supply unit 190, whether or not an external device is coupled with the interface unit 170.

The interface unit 170 performs the role of interfacing with external devices connected to the mobile communication terminal 100. For example, the interface unit 170 may include a wired/wireless headset port, a memory card port, a port for connecting to a device having an identification module, an audio Input/Output (I/O) port, a video I/O port, an earphone port, and the like. Here, the identification module may be configured as a chip for storing various information required to authenticate the mobile communication terminal 100, which may include a User Identity Module (UIM), a Subscriber Identity Module (SIM), Universal Subscriber Identity Module (USIM), and the like. Furthermore, the device having the identification module (hereinafter, referred to as an "identification device") may be implemented in a type of smart card. Hence, the identification module can be connected to the mobile communication terminal 100 via a port. The interface unit 170 may receive data or power from an external device to transfer it to each constituent element in the mobile communication terminal 100 or transmit data within the mobile communication terminal 100 to the external device.

The output unit 150 is configured to provide an output for audio signal, video signal, or alarm signal, and the output unit 150 may include the display unit 151, an audio output module 152, an alarm unit 153, and the like.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call. When the mobile communication terminal 100 is in a video call mode or image capturing mode, the display unit 151 may display a captured and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display. There may exist two or more display units 151 according to the implementation form of the mobile communication terminal 100. For example, an external display unit (not shown) and an internal display unit (not shown) may be provided at the same time in the mobile communication terminal 100.

When the display unit 151 and a touch sensitive sensor (hereinafter, referred to as a "touch sensor") have an interlayer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

A proximity sensor 141 may be arranged at an inner region of the mobile communication terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., proximity touch distance, proximity touch direction, proximity touch speed, proximity touch time, proximity touch position, proximity touch moving status, etc.). Information corresponding to the sensed proximity touch operation and the sensed proximity touch pattern may be displayed on the touch screen.

The audio output module 152 may output audio data received from the wireless communication unit 110 or stored in the memory 160, in a call signal receiving mode, a call placing mode, a recording mode, a voice recognition mode, a broadcast reception mode, and the like. The audio output module 152 may output audio signals relating to functions performed in the mobile communication terminal 100 (for example, sound alarming a call received or a message received, and the like). The audio output module 152 may include a speaker, a buzzer, and the like.

The alarm 153 outputs signals notifying occurrence of events from the portable terminal 100. The events occurring from the mobile terminal may include call received, message received, key signal input, touch input, and the like. The alarm 153 may output not only video or audio signals, but also other types of signals such as signals notifying occurrence of events in a vibration manner. When a call signal or message is received, the alarm 153 may output a vibration to notify this. Otherwise, when a key signal is inputted, the alarm 153 may output a vibration as a feedback to the inputted key signal. Through the foregoing vibration output, the user can recognize an event occurrence. The signal for notifying an event occurrence may be also outputted through the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and the like. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile communication terminal 100. The haptic module 154 may be provided at a place where the user can frequently make contact in the vehicle. For example, it may be provided at a steering wheel, a gear shift lever, and a seat.

The memory 160 may store a program for processing and controlling the controller 180. Alternatively, the memory 160 may temporarily store input/output data (e.g., map data, phonebook data, messages, audio, still images, video, and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile communication terminal 100 may operate a web storage which performs the storage function of the memory 160 on the Internet.

The interface unit 170 may generally be implemented to interface the mobile device with external devices. The interface unit 170 may allow a data reception from an external device, a power delivery to each component in the mobile communication terminal 100, or a data transmission from the mobile communication terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. Here, the identification module may be configured as a chip for storing various information required to authenticate an authority to use the mobile communication terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile communication terminal 100 via a port. The interface unit 170 may receive data or power from an external device to transfer it to each constituent element in the mobile communication terminal 100 or transmit data within the mobile communication terminal 100 to the external device.

The interface unit 170 may serve as a path for power to be supplied from an external cradle to the mobile communication terminal 100 when the mobile communication terminal 100 is connected to the external cradle or as a path for transferring various command signals inputted from the cradle by a user to the mobile communication terminal 100. Such various command signals or power inputted from the cradle may operate as signals for recognizing that the mobile device has accurately been mounted to the cradle.

The controller 180 typically controls the overall operations of the mobile communication terminal 100. For example, the controller 180 performs the control and processing associated with telephony calls, data communications, video calls, and the like. The controller 180 may include a multimedia module 181 for reproducing multimedia data. The multimedia module 181 may be implemented in an integrated manner within the controller 180 or may be implemented in a separate manner from the controller 180.

Furthermore, the controller 180 can perform a pattern recognition processing so as to recognize writing or drawing input on the touch screen as text or image.

The power supply unit 190 receives external power and internal power under the control of the controller 180 to provide power required by various components.

Various embodiments described herein may be implemented in a recording medium that can be read by a computer or similar device using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself. For software implementation, the embodiments such as procedures or functions may be implemented together with separate software modules. The software modules may perform at least one function or operation described herein. Software codes can be implemented by a software application written in any suitable programming language. The software codes may be stored in the memory 160 and executed by the controller 180.

The voice recognition module 182 recognizes voice uttered by the user, and performs the relevant function according to the recognized voice signal.

A navigation session 300 applied to the mobile communication terminal 100 displays a driving route on map data.

Figure 2:
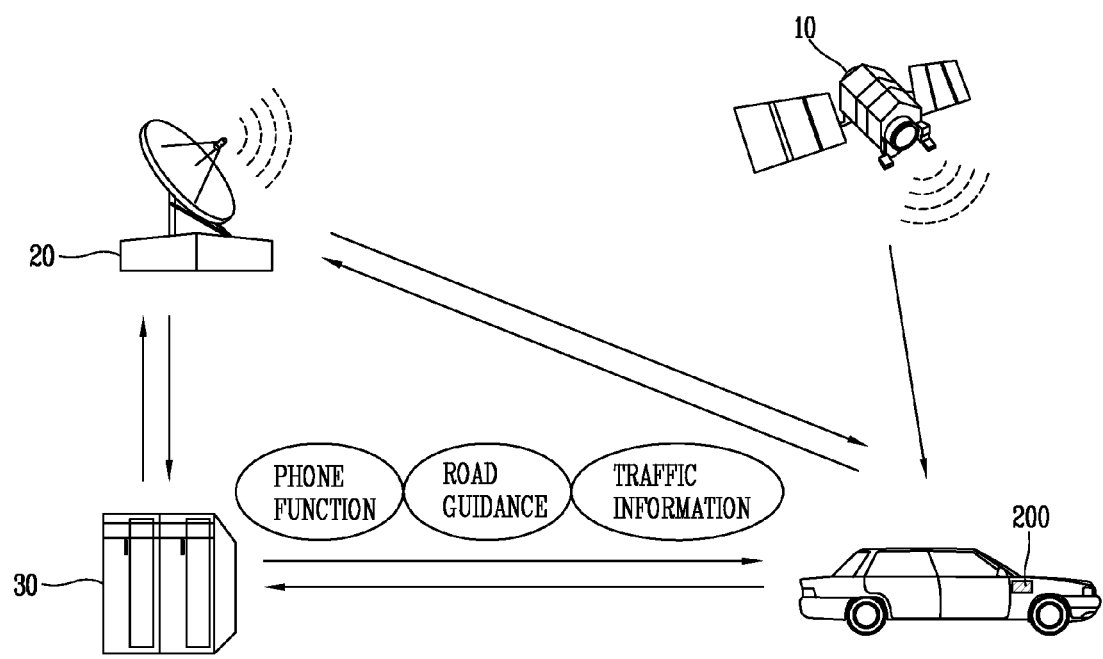
FIG. 2 is a block diagram illustrating a vehicle navigation system for explaining the embodiments of the present disclosure.

FIG. 2 is a block diagram illustrating a vehicle navigation system according to the embodiments of the present disclosure.

As illustrated in FIG. 2, a vehicle navigation system may be configured by including a information providing center 30 for providing traffic information and various data (for example, programs, execution files, etc.), and a telematics terminal 200 mounted within a vehicle for receiving traffic information through a long-range wireless communication network 20 and/or a short-range wireless communication network, and providing a road guide service based on a GPS signal received through a satellite 10 and the traffic information. Here, the communication network may further include a wired or wireless communication network such as local area network (LAN), wide area network (WAN), and the like.

Various traffic information (for example, road traffic information or interesting area information) as well as traffic light information are collected via the communication network, and the collected information are processed by the information providing center 30 (for example, a server) according to Transport Protocol Expert Group (TPEG) standard so as to be sent to a broadcasting station. Accordingly, the broadcasting station inserts such traffic information including the traffic light information in a broadcast signal and broadcasts the broadcast signal to the telematics terminal 200.

The server may reconstruct various traffic information, which are collected via different paths connected to the communication network, for example, collected by an operator's input, via a wired/wireless Internet and digital broadcast services, such as Transport Data Channel (TDC) and Multimedia Object Transport (MOC), or from other servers or a probe car, into a traffic information format, such as a format according to the TPEG standard, which is a standard for traffic information services, thereby sending the reconstructed traffic information to the broadcasting station.

The server may thus generate the traffic information format of the TPEG standard including traffic light information to send to the broadcasting station.

The broadcasting station may then load the traffic information including the traffic light information received from the server in a broadcast signal and wirelessly send the broadcast signal to the telematics terminal 200, for example, a navigation apparatus, which is mounted in the vehicle to play a role of a traffic information receiving terminal. The traffic information may include not only the traffic light information but also information related to various traffic conditions, which are required for running vehicles, ships and flights, such as accidents, road conditions, traffic jam, road construction, road block, public traffic network delay, flight delay and the like.

The broadcasting station may receive the traffic information including the traffic light information processed by the server, and send the same to the telematics terminal 200 via a digital signal according to various digital broadcasting standards, examples of which may include European Digital Audio Broadcasting (DAB) based on Eureka-147 [ETSI EN 300 401], Digital Multimedia Broadcasting-terrestrial/satellite (DMB-T/S), Digital Video Broadcasting-terrestrial (DVB-T), portable Digital Video Broadcasting-Handheld (DVB-H), Media Forward Link Only (MFLO), and the like.

Furthermore, the broadcasting station may send the traffic information including the traffic light information via a wired/wireless network, such as a wired/wireless Internet.

The vehicle 200 indicates any transport of a typical car, bus, train, ship, flight and the like, which are made by employing mechanical and electronic devices for the purpose of carrying or transporting humans or objects.

The vehicle 200 has a traffic information receiving terminal to receive traffic light information from the broadcasting station. The traffic light information is processed to be sent to a user in a graphic, text and/or audio format(s).

Hereinafter, the configuration of a telematics terminal 200 for explaining an embodiment of the present disclosure will be described with reference to FIG. 3.

Figure 3:
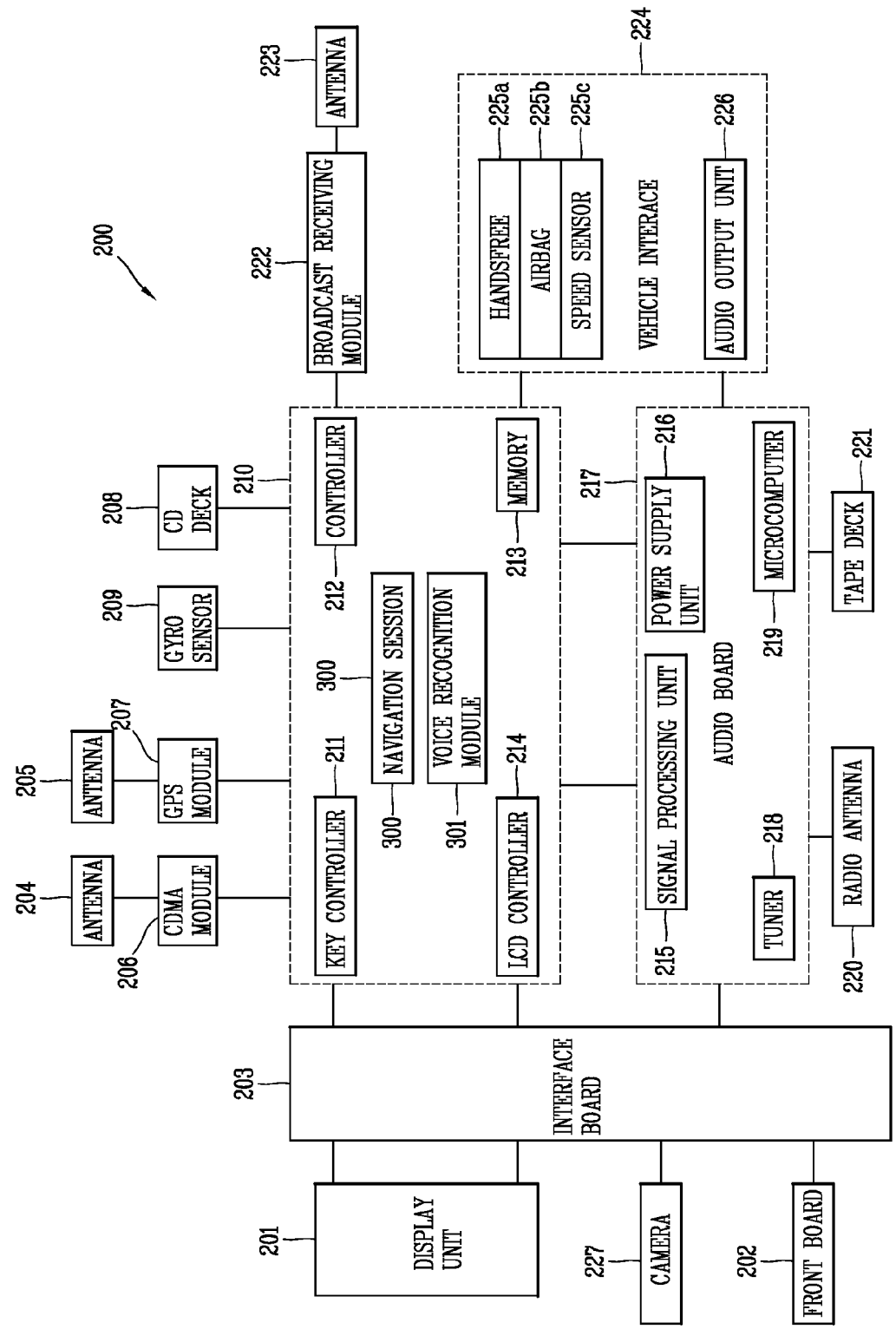
FIG. 3 is a block diagram illustrating the configuration of a telematics terminal system for explaining the embodiments of the present disclosure.

FIG. 3 is a block diagram illustrating the configuration of a telematics terminal 200 for explaining embodiments of the present disclosure.

As shown in FIG. 3, the telematics terminal 200 may include a main board 210. The main board 210 may include a controller (for example, a central processing unit (CPU)) 212 for overall control of the telematics terminal 200, a memory 213 for storing various types of information, a key controller 211 for control of various types of key signals, and a liquid crystal display (LCD) controller 214 for control of LCD.

The memory 213 may store map information (map data) for displaying road guidance information on a digital map. Also, the memory 213 may store a traffic information collection control algorithm for allowing input of traffic information according to road conditions that a vehicle is currently traveling, and information for control of the algorithm.

The main board 210 may include a code division multiple access (CDMA) module 206 which is a mobile communication terminal provided with a unique device number and integrated into a vehicle, a GPS module 207 for receiving a Global Positioning System (GPS) signal to guide a location of a vehicle, track a traveling route from a depart point to an arrival point, etc., or transmitting traffic information collected by a user using a GPS signal, a compact disk (CD) deck 208 for reproducing a signal recorded on a CD; a gyro sensor 209, and the like. The CDMA module 206 and the GPS module 207 may transmit and receive signals via antennas 204 and 205, respectively.

Furthermore, the broadcast receiving module 222 may be connected to the main board 210 to receive a broadcast signal via an antenna 223. The main body 210 may be connected, via an interface board 203, with a display (LCD) 201 controlled by the LCD controller 214, a front board 202 controlled by the key controller 211, and a camera 227 for capturing inside and/or outside of the vehicle. The display 201 may display various video signals, text signals and the like. The front board 202 may be provided with buttons for various types of key signal inputs, and provide a key signal corresponding to the user-selected button to the main board 210. Also, the display 201 may include the proximity sensor and the touch sensor (touch screen) shown in FIG. 2.

The front board 202 may include a menu key for allowing direct input of traffic information. The menu key may be controlled by the key controller 211.

An audio board 217 may be connected to the main board 210 to process various audio signals. The audio board 217 may include a microcomputer 219 for control of the audio board 217, a tuner 218 for receiving a radio signal, a power supply unit 216 for supplying power to the microcomputer 219, and a signal processor 215 for processing various audio signals.

Furthermore, the audio board 217 may also include a radio antenna 220 for receiving a radio signal, and a tape deck 221 for reproducing an audio tape. The audio board 217 may further include an audio output unit (for example, amplifier) 226 for outputting an audio (voice) signal processed in the audio board 217.

The audio output unit (amplifier) 226 may be connected to a vehicle interface 224. That is, the audio board 217 and the main board 210 may be connected to the vehicle interface 224. The vehicle interface 224 may also be provided for connection of a hands-free 225a for inputting a voice signal, an airbag 226b for safety of a passenger, a speed (velocity) sensor 225c for detecting the vehicle speed, and the like. The speed sensor 225c may calculate the vehicle speed and provide the calculated speed information to the controller (CPU) 212.

A navigation session 300 applied to the telematics terminal 200 may generate road guidance information based upon map data and current location information related to the vehicle, and notify a user of the generated road guidance information.

The display 201 may detect a proximity touch within a display window via a proximity sensor. For example, the display 201 detects a location of a proximity touch when a pointer (for example, a finger or a stylus pen) generates the proximity touch, and outputs location information corresponding to the detected location to the controller 212.

A voice recognition device (or voice recognition module) 301 may recognize a user's voice, and perform a corresponding function according to the recognized voice signal.

The navigation session 300 applied to the telematics terminal 200 may display a driving route on map data, and automatically form a wireless network with a terminal (for example, vehicle navigation apparatus) mounted on a nearby vehicle and/or a mobile communication terminal carried by a nearby pedestrian through a wireless communication network (for example, short-range radio communication network) when the mobile communication terminal 100 is located within a predetermined distance from a dead zone included in the driving path, thereby receiving the location information of the nearby vehicle from the terminal mounted on the nearby vehicle, and receiving the location information of the nearby pedestrian from the mobile communication terminal carried by the nearby pedestrian.

Figure 4:
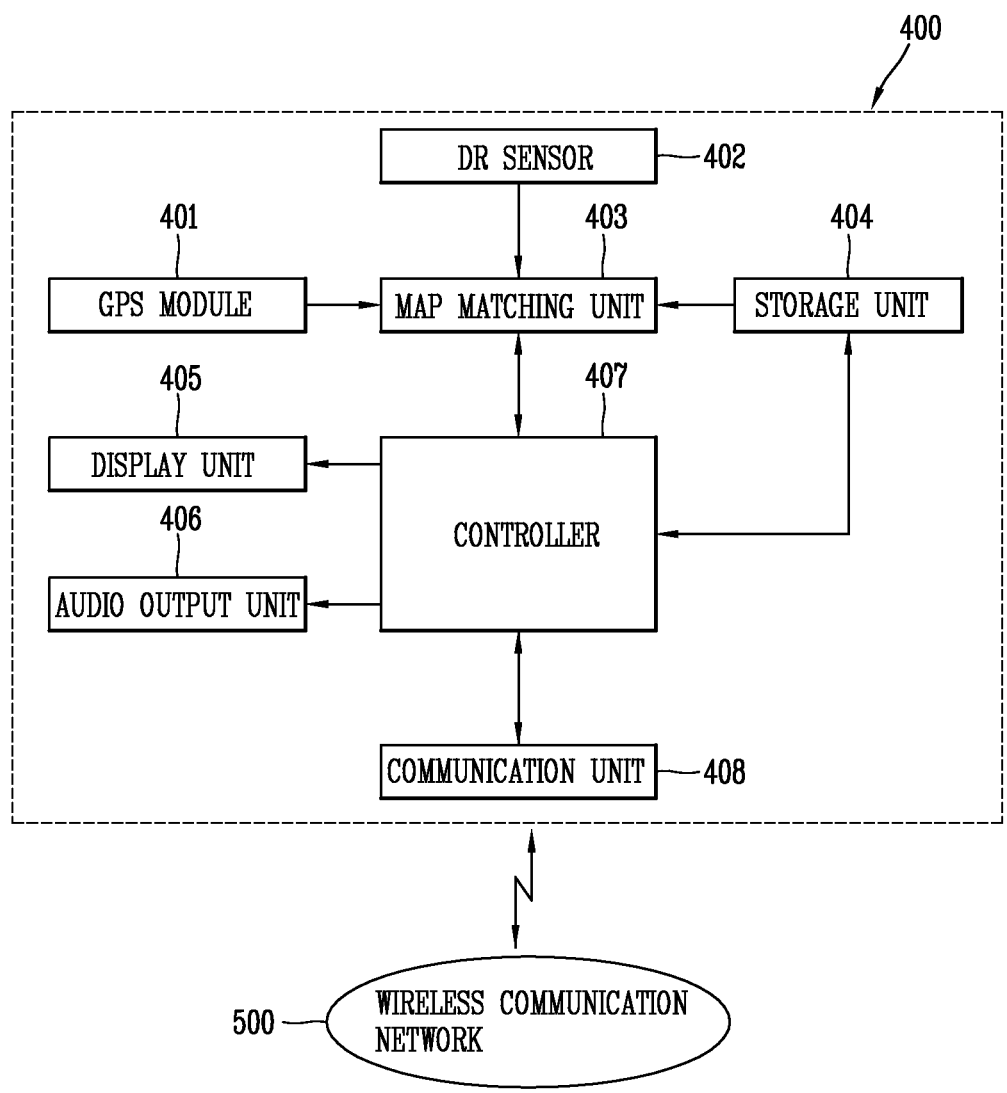
FIG. 4 is a block diagram illustrating the configuration of a navigation (vehicle navigation) apparatus for explaining the embodiments of the present disclosure.

FIG. 4 is a block diagram illustrating the configuration of a navigation (vehicle navigation) apparatus 400 to which an vehicle control apparatus according to embodiments of the present invention is applied.

The navigation (vehicle navigation) apparatus 400 can be classified into in-dash type and on-dash type depending on how the navigation vehicle 400 is installed in the vehicle 200. An in-dash type navigation (vehicle navigation) apparatus is the one that is firmly installed by being inserted in a predetermined space assigned in a dashboard of the vehicle 200. An on-dash type navigation (vehicle navigation) apparatus is either attached on a dash board of the vehicle 200 or installed by using a dedicated mount near the dash board. Since the on-dash type navigation (vehicle navigation) can be detached or attached, it can be separated from the vehicle 200 to be carried by the user.

The navigation (vehicle navigation) apparatus 400 according to an embodiment of the present invention includes both the aforementioned in-dash and on-dash type navigation (vehicle navigation) apparatuses. In addition, the navigation (vehicle navigation) apparatus 400 further includes all kinds of information processing devices, such as various portable terminals, capable of receiving and/or processing of traffic information to carry out a navigation function in association with a global positioning system (GPS) receiver receiving navigation messages transmitted from GPS satellites in the vehicle 200.

As illustrated in FIG. 4, the navigation apparatus may include a GPS module 401 for receiving a global positioning system (GPS) signal received from a satellite and generating first vehicle position data of a mobile vehicle navigation apparatus (assumed to be in the same location as the telematics terminal 200 or mobile communication terminal 100) based on the received GPS signal; a dead-reckoning (DR) sensor 402 for generating second vehicle position data based on a traveling direction of a vehicle and the vehicle speed; a storage unit (or memory) 404 for storing map data and various information; a map matching unit 403 for generating an estimated vehicle position based on the first vehicle position data and the second vehicle position data, and matching the generated vehicle position to a link (map matching link or map matching road) in the map data stored in the storage unit 404, and outputting the matched map information (map matching result); a communication unit 408 for receiving real-time traffic information from an information providing center and/or neighboring vehicles through a wireless communication network 500 and carrying out a phone communication; a controller 407 for generating road guide information based on the matched map information (map matching result); a display unit 405 for displaying a road guide map (including POI information) included in the road guide information and the traffic information; and an audio output unit 406 for outputting an audio signal corresponding to road guide voice information (road guide voice message) included in the road guide information or the traffic information.

Here, the communication unit 408 may further include a hands-free having a Bluetooth module, and receive a broadcast signal including traffic information in a TPEG format from the broadcasting station through an antenna. The broadcast signal includes video and audio data according to various specifications, such as terrestrial or satellite digital multimedia broadcasting (DMB), digital audio broadcasting (DAB), digital video broadcasting (DVB-T, DVB-H), and the like. In addition, the broadcast signal includes traffic information according to traffic information (TPEG) services and binary format for scene (BIFS) data services, and supplementary information such as various supplementary data. Moreover, the communication unit 408 synchronizes a signal bandwidth provided with traffic information, demodulates the synchronized signal, and outputs the decoded signal to the TPEG decoder (included in a controller 407).

The TPEG decoder decodes traffic information in a TPEG format and provides a variety of information including traffic lights information included in the traffic information to the controller 407.

Furthermore, the road guide information may include various information associated with travel, such as traffic lane information, travel speed limit information, turn-by-turn information, traffic safety information, traffic guide information, vehicle information, road search information, and the like, as well as map data.

The signal received through the GPS module 401 may be configured to provide the location information of a terminal to the navigation apparatus 400 using wireless communication methods proposed by the Institute of Electrical and Electronics Engineers (IEEE), such as the IEEE 802.11 Wireless Network Standard for a wireless LAN including wireless LANs, some of infrared communications, etc., the IEEE 802.15 Standard for a wireless personal area network (PAN) including Bluetooth, UWB, ZigBee, etc., the IEEE 802.16 Standard for a wireless metropolitan area network (MAN) broadband wireless access (BWA) including fixed wireless accesses (FWA), etc., and the IEEE 802.20 Mobile Internet Standard for a wireless MAN mobile broadband wireless access (MBWA) including Wibro, WiMAX, etc.

An input unit may be further provided in the navigation apparatus 400, and the input unit selects the user's desired function or receives information, and various devices may be used such as a keypad, a touch screen, a jog shuttle, a microphone, and the like.

The map matching unit 403 generates an estimated location of the vehicle on the basis of the first location data and the second location data, and reads map data corresponding to a travel path from the storage unit 404.

The map matching unit 403 matches the estimated location of the vehicle with a link (road) included in the map data, outputs the matched map information (map-matched result) to the controller 407. For example, the map matching unit 403 generates an estimated location of the vehicle on the basis of the first location data and the second location data, matches the generated estimated location of the vehicle with links within the map data stored in the storage unit 404 based upon the link sequence thereof, and outputs the matched map information (map-matched result) to the controller 407. The map matching unit 403 may output road attribute information such as single-level or double-level roads included in the matched map information (map-matched result) to the controller 407. Furthermore, the function of the map matching unit 403 may be implemented by the controller 407.

The storage unit 404 stores map data. At this time, the stored map data may include a geographic coordinate (or longitude and latitude coordinate) for displaying the longitude and latitude in the Degree/Minute/Second (DMS) unit. Here, the stored map data may use the Universal Transverse Mercator (UTM) coordinate, the Universal Polar System (UPS) coordinate, the Transverse Mercator (TM) coordinate, and the like, in addition to the geographic coordinate.

The storage unit 404 stores various information, such as various menu screens, points of interest (hereinafter, "POI"), function characteristic information based upon specific locations of the map data, and the like.

The storage unit 404 stores various user interfaces (UI) and/or graphic user interfaces (GUI).

The storage unit 404 stores data, programs, and the like, which are required for operating the navigation device 400.

The storage unit 404 stores destination information inputted from the user through the input unit. Here, the destination information may be a destination, or either one of a departure and a destination.

The display unit 405 displays image information (or road guide map) included in the road guide information generated by the controller 407. Here, the display unit 405 may include a touch sensor (touch screen) or proximity sensor. Furthermore, the road guide information may include various information associated with driving a vehicle, such as traffic lane information, driving speed limit information, turn-by-turn information, traffic safety information, traffic guide information, vehicle information, road search information, and the like, in addition to map data.

Furthermore, when displaying the image information, the display unit 405 may display various contents, such as various menu screens, road guide information, and the like, using user interfaces and/or graphic user interfaces included in the storage unit 404. Here, the contents displayed on the display unit 405 include various text or image data (including map data or various information data), and menu screens including icons, list menus, combo boxes, and the like.

The audio output unit 406 outputs voice information (or voice messages for road guide information) included in the road guide information generated by the controller 407. Here, the audio output unit 406 may be an amplifier or speaker.

The controller 407 generates road guide information on the basis of the matched map information, and outputs the generated road guide information to the display unit 405 and audio output unit 406. Here, the display unit 405 displays the road guide information.

The controller 407 receives real-time traffic information from the information providing center and/or a terminal mounted on a neighboring vehicle (vehicle navigation device) to generate road guide information.

Furthermore, the controller 407 is connected with a call center through a communication unit 408 to perform a phone call, transmit or receive information between the navigation device 400 and the call center. Here, the communication unit 408 may further include a hands-free module having a Bluetooth function using a short-range wireless communication method.

When a PIO search menu is selected by the user, the controller 407 retrieves POI located on a path from the current location to the destination, and displays the retrieved POI on the display unit 405. At this time, the controller 407 retrieves POI (a position at which the path is not to be changed (retrieved again), for example, POI located at the left or right side of the driving road) located on the path and/or POI (a position at which the path is to be changed, for example, a position at which a preset path should be changed to pass through the nearby POI) located in the vicinity of the path, and display the retrieved POI on the display unit 405.

Hereinafter, an information providing apparatus and a method thereof according to a first embodiment of the present disclosure capable of easily and effectively sharing (providing) information (for example, content, data, etc.) between a plurality of terminals will be described with reference to FIGS. 1 through 6. The plurality of terminals may be homogeneous or heterogeneous terminals with respect to another.

Figure 5:
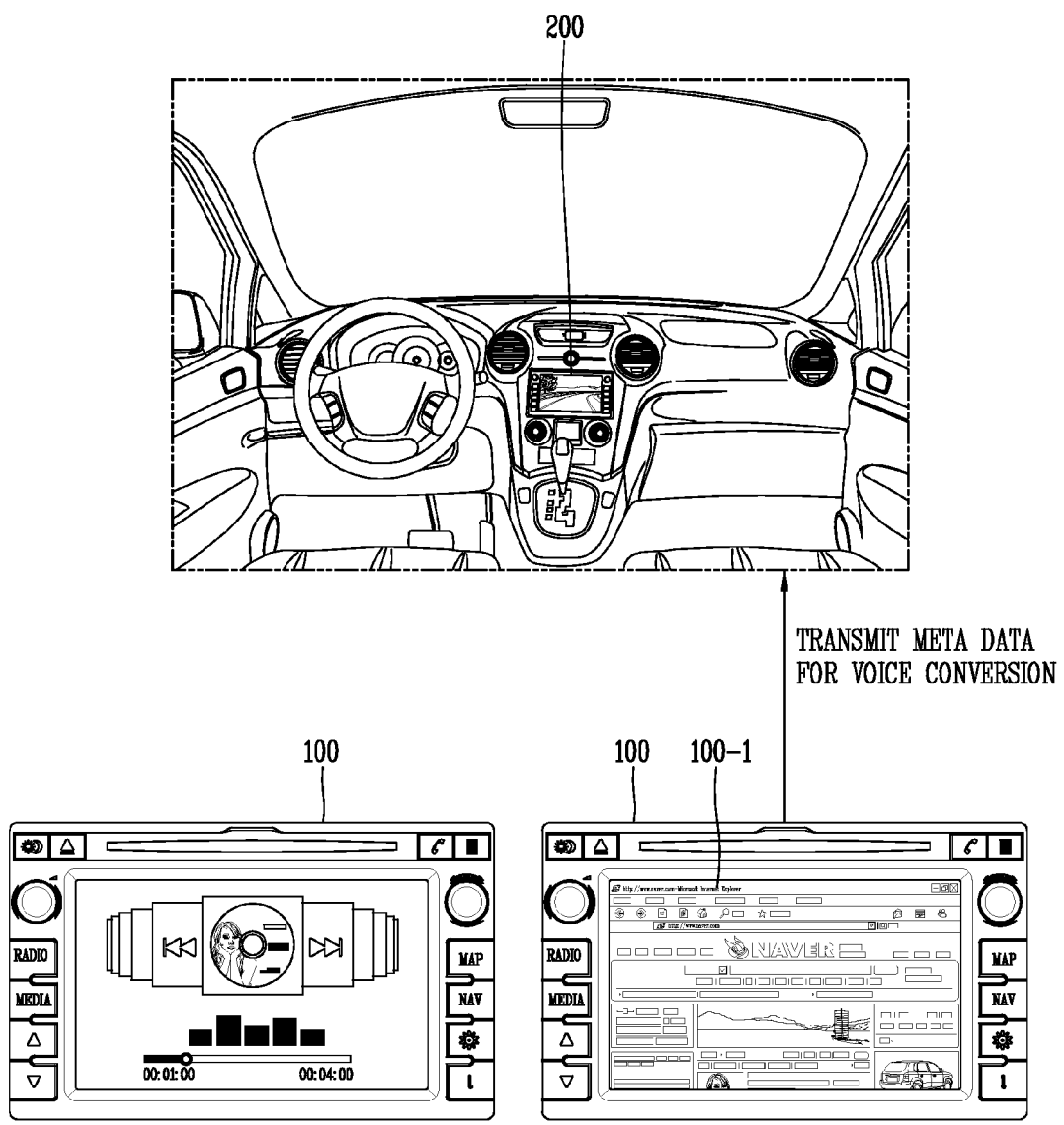
FIG. 5 is an exemplary view illustrating terminals to which an information providing apparatus according to the embodiments of the present disclosure is applied.

FIG. 5 is an exemplary view illustrating terminals to which an information providing apparatus according to the embodiments of the present disclosure is applied.

As illustrated in FIG. 5, the plurality of terminals may be configured with a telematics terminal (or head unit) 200 mounted on a vehicle and a plurality of mobile communication terminals 100, and the plurality of terminals may be connected to one another through a wireless or wired communication network. The telematics terminal 200 may be used by a vehicle driver, and the plurality of mobile communication terminals 100 may be used by vehicle passengers.

A navigation apparatus 400 or mobile communication terminal 100 may be also used instead of the telematics terminal 200. Instead of the plurality of mobile communication terminals 100, a plurality of rear seat entertainment systems (RSEs), portable phones, smart phones, notebook computers, digital broadcast terminals, personal digital assistants (PDAs), portable multimedia players (PMPs), tablet personal computers (PCs), and the like. Hereinafter, the telematics terminal 200 and plurality of mobile communication terminals 100 will be described for example.

Figure 6:
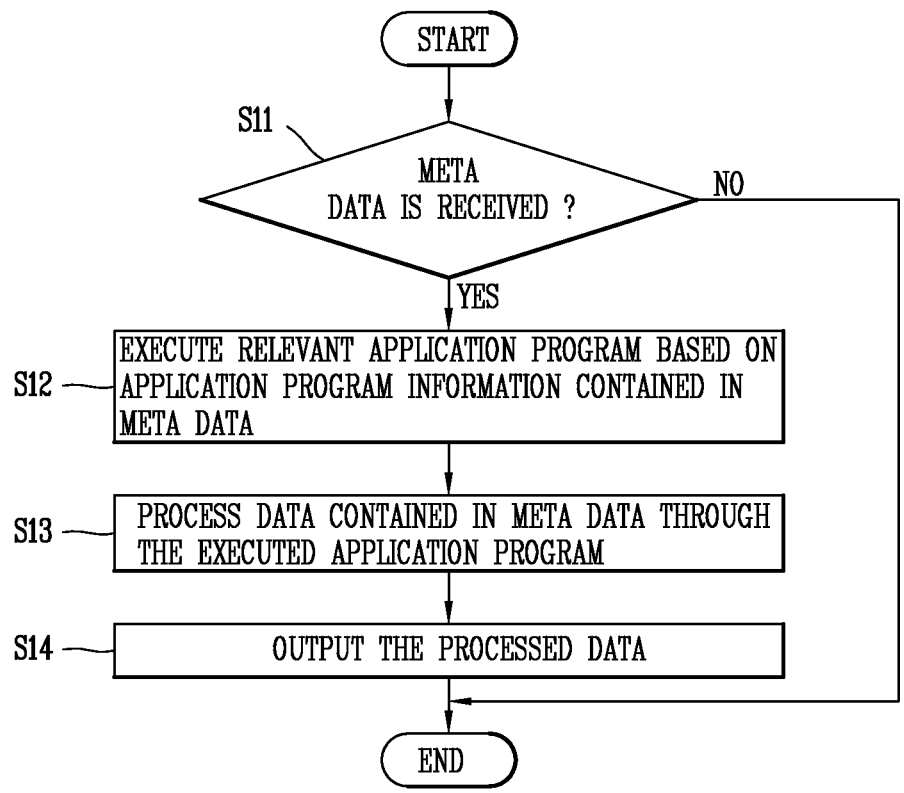
FIG. 6 is a flow chart illustrating an information providing method according to a first embodiment of the present disclosure.

FIG. 6 is a flow chart illustrating an information providing method according to a first embodiment of the present disclosure.

First, the telematics terminal 200 (for example, controller 212) determines whether or not meta data is received from the mobile communication terminal 100 (S11).

The meta data may be generated by the mobile communication terminal 100. For example, the mobile communication terminal 100 (for example, controller 180) may display a website 100-1 on the display unit 151, and generate the meta data including text data contained in the website, application program information (for example, TTS application program information) for outputting (reading) the text data, and format information indicating the text data when a user input for requesting to transmit the website 100-1 to the telematics terminal 200 is received by the user (for example, the user wants to share a website with the driver), and transmit the meta data to the telematics terminal 200 through a wired or wireless communication network. The mobile communication terminal 100 (for example, controller 180) may display a website on the display unit 151, and generate the meta data including address information corresponding to the website, application program information (for example, text-to-speech (TTS) application program information) for outputting (reading) the website, and format information indicating the website when a user input for requesting to transmit the website to the telematics terminal 200 is received by the user, and transmit the meta data to the telematics terminal 200 through a wired or wireless communication network. The telematics terminal 200 (for example, controller 212) may generate and transmit the meta data. A user input for requesting to transmit the website to the telematics terminal 200 may be a specific button input, a voice command (voice recognition), a gesture, and the like.

When meta data is received from the mobile communication terminal 100, the telematics terminal 200 (for example, controller 212) executes an application program corresponding to the application program information based on the application program information included in the meta data (S12). For example, the telematics terminal 200 executes a TTS application program when the application program information is TTS application program information, and executes an audio (music) reproduction application program when the application program information is audio (music) reproduction application program information.

The telematics terminal 200 (for example, controller 212) processes data contained in the meta data through the executed application program (S13). For example, the telematics terminal 200 executes the TTS application program and then reads the data through the TTS application program. When the application program information is audio (music) reproduction application program information, the telematics terminal 200 executes an audio (music) reproduction application program and then reproduces data through the audio (music) reproduction application program.

The telematics terminal 200 (for example, controller 212) outputs the processed data through the audio output unit 226 (S14). For example, the telematics terminal 200 executes the TTS application program and then reads the data through the TTS application program, and outputs the read data through the audio output unit 226. When the application program information is audio (music) reproduction application program information, the telematics terminal 200 executes an audio (music) reproduction application program and then reproduces data through the audio (music) reproduction application program, and outputs the reproduced data through the audio output unit 226. In other words, the driver automatically converts the information (or audio (music), etc.) of the website into a voice to output it through the audio output unit 226 of the telematics terminal 200 since viewing information (for example, video, website, etc.) other than navigation information is prohibited due to the road traffic act or the other information is an obstacle to driving a vehicle, and thus the information (or audio (music), etc.) of the website is automatically converted into a voice and output through the audio output unit 226 of the telematics terminal 200.

When address information corresponding to the website is contained in the meta data, the telematics terminal 200 (for example, controller 212) retrieves a website corresponding to the address information based on the address information, and reads the retrieved text data of the website through the TTS application program, and outputs the read data through the audio output unit 226. When the address information of the audio (music) is contained in the meta data, the telematics terminal 200 retrieves audio (music) data corresponding to the address information, and reproduces the retrieved audio (music) data through the audio (music) reproduction application program, and outputs the reproduced data through the audio output unit 226.

Accordingly, in an information providing apparatus and a method thereof according to a first embodiment of the present disclosure, data received from an external terminal (for example, mobile communication terminal 100) may be automatically converted into a voice for output, thereby allowing the driver to easily and conveniently listen to data received from the external terminal as a voice while concentrating on his or her driving. For example, a first mobile communication terminal may generate meta data for executing the task of a first application program, and transmit (output) the generated meta data to a second mobile communication terminal, and the second mobile communication terminal may execute the task of the first application program, and output the execution result through the output unit of the second mobile communication terminal or transmit (or output) the execution result to the first mobile communication terminal, thereby allowing the execution result to be shared with each other.

Hereinafter, an information providing apparatus and a method thereof according to a second embodiment of the present disclosure capable of easily and effectively sharing (providing) information (for example, content, data, etc.) between a plurality of terminals will be described with reference to FIGS. 7 and 8.

Figure 7:
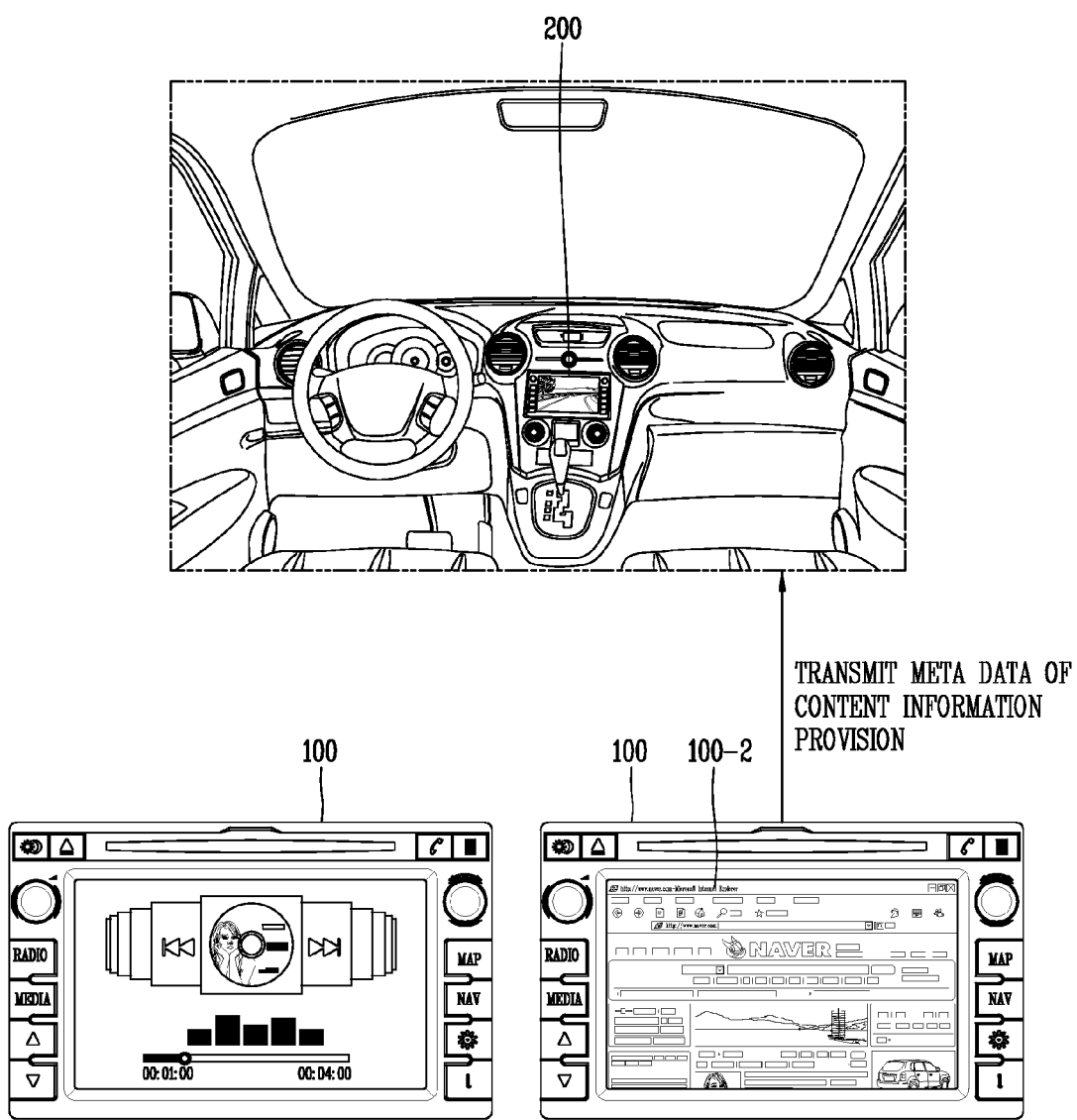
FIG. 7 is an exemplary view illustrating terminals to which an information providing apparatus according to a second embodiment of the present disclosure is applied.

FIG. 7 is an exemplary view illustrating terminals to which an information providing apparatus according to a second embodiment of the present disclosure is applied.

Figure 8:
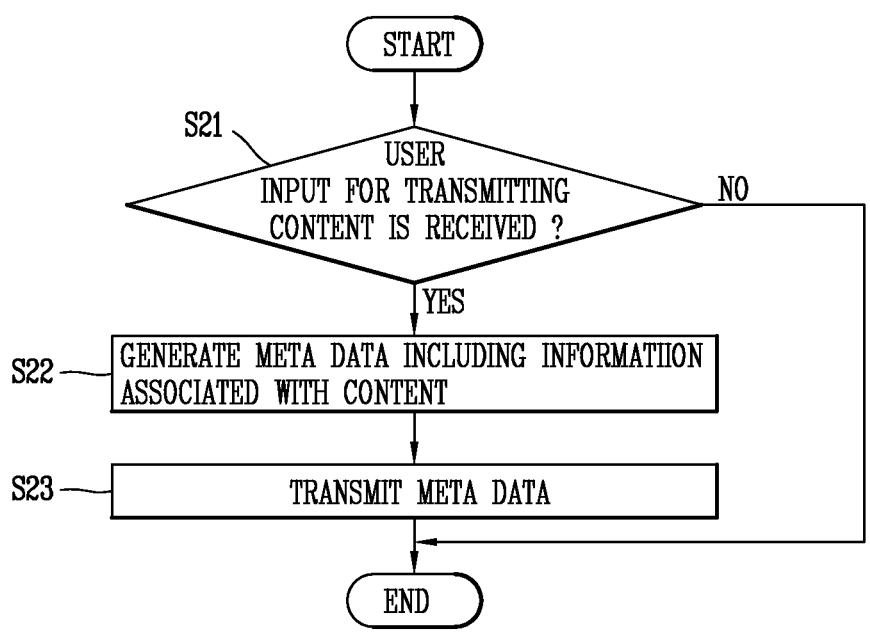
FIG. 8 is a flow chart illustrating an information providing method according to a second embodiment of the present disclosure.

FIG. 8 is a flow chart illustrating an information providing method according to a second embodiment of the present disclosure.

First, the telematics terminal 200 (for example, controller 212) determines whether or not a user input for requesting to transmitting audio-based content to the mobile communication terminal 100 is received while outputting the audio-based content (or photo, video-based content) such as music/radio according to a user request (S21). A user input for requesting to transmit the audio-based content to the mobile communication terminal 100 may be a specific button input, a voice command, a gesture, and the like.

The telematics terminal 200 (for example, controller 212) generates meta data including the location information of the audio-based content, the format information of the audio-based content, and information (for example, song title, singer information, singer album information, etc) related to the audio-based content when a user input for requesting to transmit the audio-based content to the mobile communication terminal 100 is received by the user (for example, when the driver wants to share music information with the vehicle passenger) (S22).

The telematics terminal 200 (for example, controller 212) transmits the meta data to the mobile communication terminal 100 through a wired or wireless communication network (S23).

The mobile communication terminal 100 receives the meta data, and displays information contained in the received meta data on the display unit 151, and automatically retrieves information (for example, song title, singer information, singer album information, etc) related to the audio-based content from the information contained in the meta data, and displays the retrieved information 100-2 on the display unit 151.

Accordingly, in an information providing apparatus and a method thereof according to a second embodiment of the present disclosure, meta data including information related to audio-based content may be generated and transmitted while outputting the audio-based content (or photo, video-based content) such as music/radio through the audio output unit 226, thereby allowing the driver to easily and conveniently share music information being listened to with the vehicle passenger.

Hereinafter, an information providing apparatus and a method thereof according to a third embodiment of the present disclosure capable of easily and effectively sharing (providing) information between a plurality of terminals will be described with reference to FIGS. 9 and 10.

Figure 9:
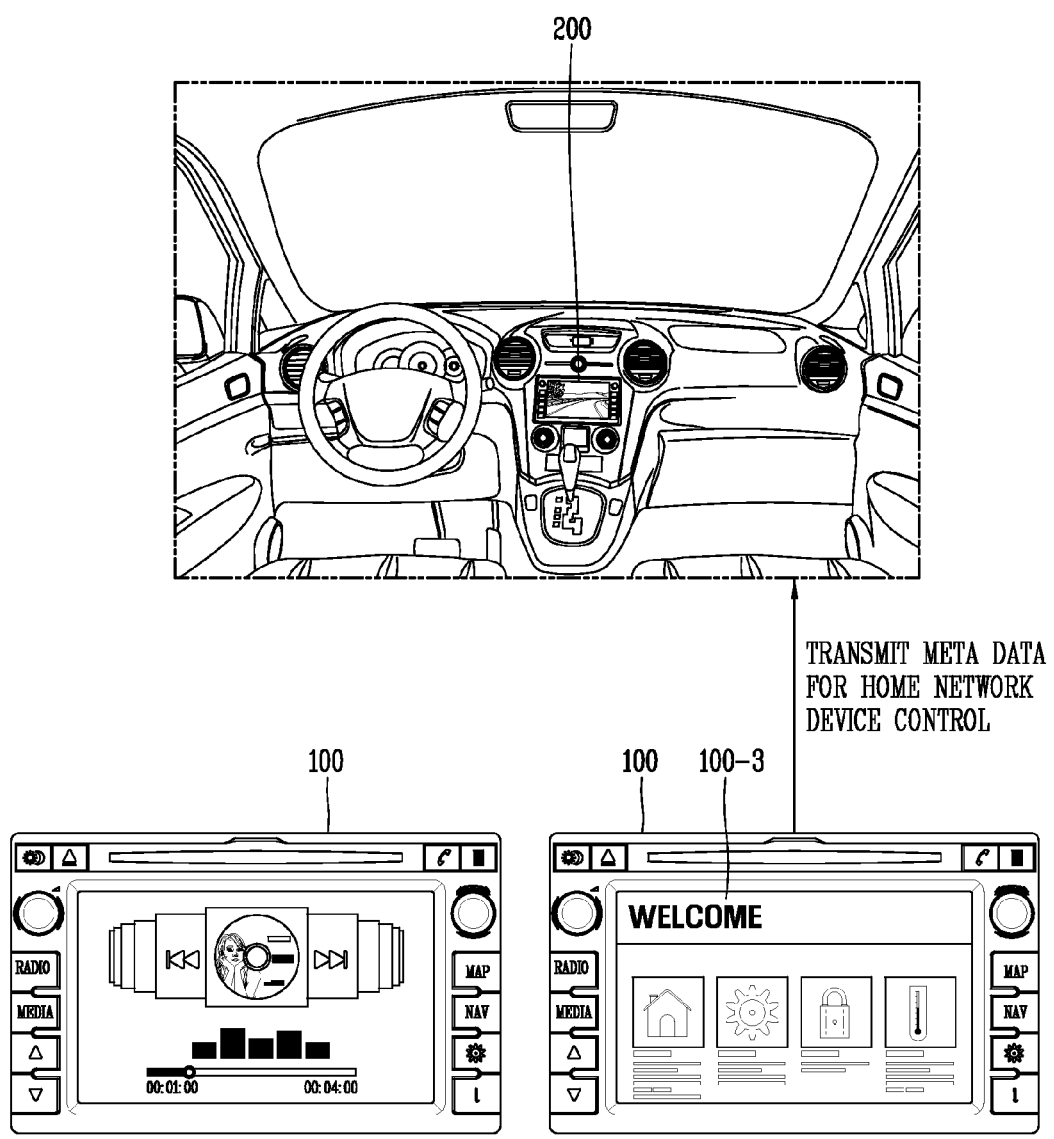
FIG. 9 is an exemplary view illustrating terminals to which an information providing apparatus according to a third embodiment of the present disclosure is applied.

FIG. 9 is an exemplary view illustrating terminals to which an information providing apparatus according to a third embodiment of the present disclosure is applied.

Figure 10:
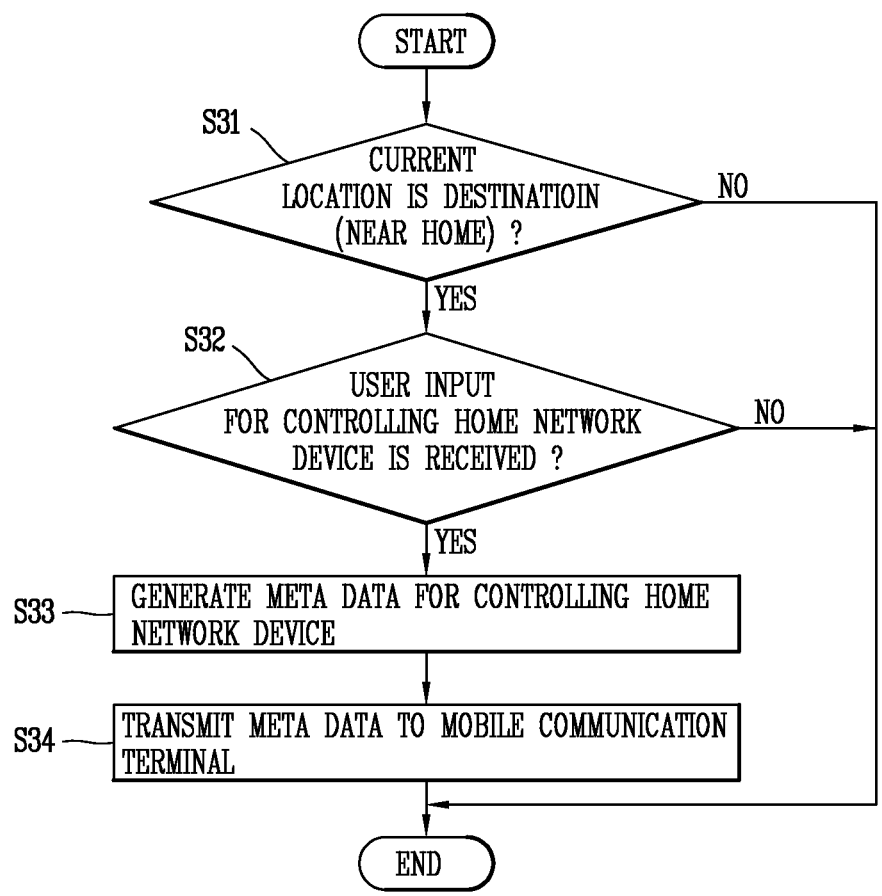
FIG. 10 is a flow chart illustrating an information providing method according to a third embodiment of the present disclosure.

FIG. 10 is a flow chart illustrating an information providing method according to a third embodiment of the present disclosure.

First, the telematics terminal 200 (for example, controller 212) determines whether or not the current location is a destination (S31). For example, the telematics terminal 200 (for example, controller 212) determines whether or not the current location is near home which is a destination.

When the current location is a destination (for example, near home), the telematics terminal 200 (for example, controller 212) determines whether or not a user input for requesting to transmitting meta data for controlling a home network device or home network devices to the mobile communication terminal 100 is received (S32). A user input for requesting to transmit the meta data to the mobile communication terminal 100 may be a specific button input, a voice command, a gesture, and the like.

The telematics terminal 200 (for example, controller 212) generates meta data including request information for requesting to execute an application program for controlling the home network device(s) when a user input for requesting to transmit the meta data to the mobile communication terminal 100 is received by the user (S33).

The telematics terminal 200 (for example, controller 212) transmits the meta data to the mobile communication terminal 100 through a wired or wireless communication network (S34).

The mobile communication terminal 100 receives the meta data, and automatically displays an application program 100-3 for controlling the home network device(s) on the display unit 151 based on request information contained in the received meta data. Here, the application program 100-3 for controlling the home network device(s) may be installed in advance in the telematics terminal 200 (for example, controller 212) and the mobile communication terminal 100. The home network device as a device connected to a home network at home or in an office may include a television, a washer, an air conditioner, a room thermostat, a lighting controller, a door controller, and the like.

Accordingly, in an information providing apparatus and a method thereof according to a third embodiment of the present disclosure, meta data for controlling a home network device may be transmitted to the mobile communication terminal of the vehicle passenger when the driver arrives in the vicinity of his or her home which is a destination, thereby allowing the passenger to quickly and safely control the home network device even during the vehicle driving (for example, during the parking) according to the driver's instruction while the driver parks a vehicle near his home.

Hereinafter, an information providing apparatus and a method thereof according to a fourth embodiment of the present disclosure capable of easily and effectively sharing (providing) information between a plurality of terminals will be described with reference to FIGS. 11 and 12.

Figure 11:
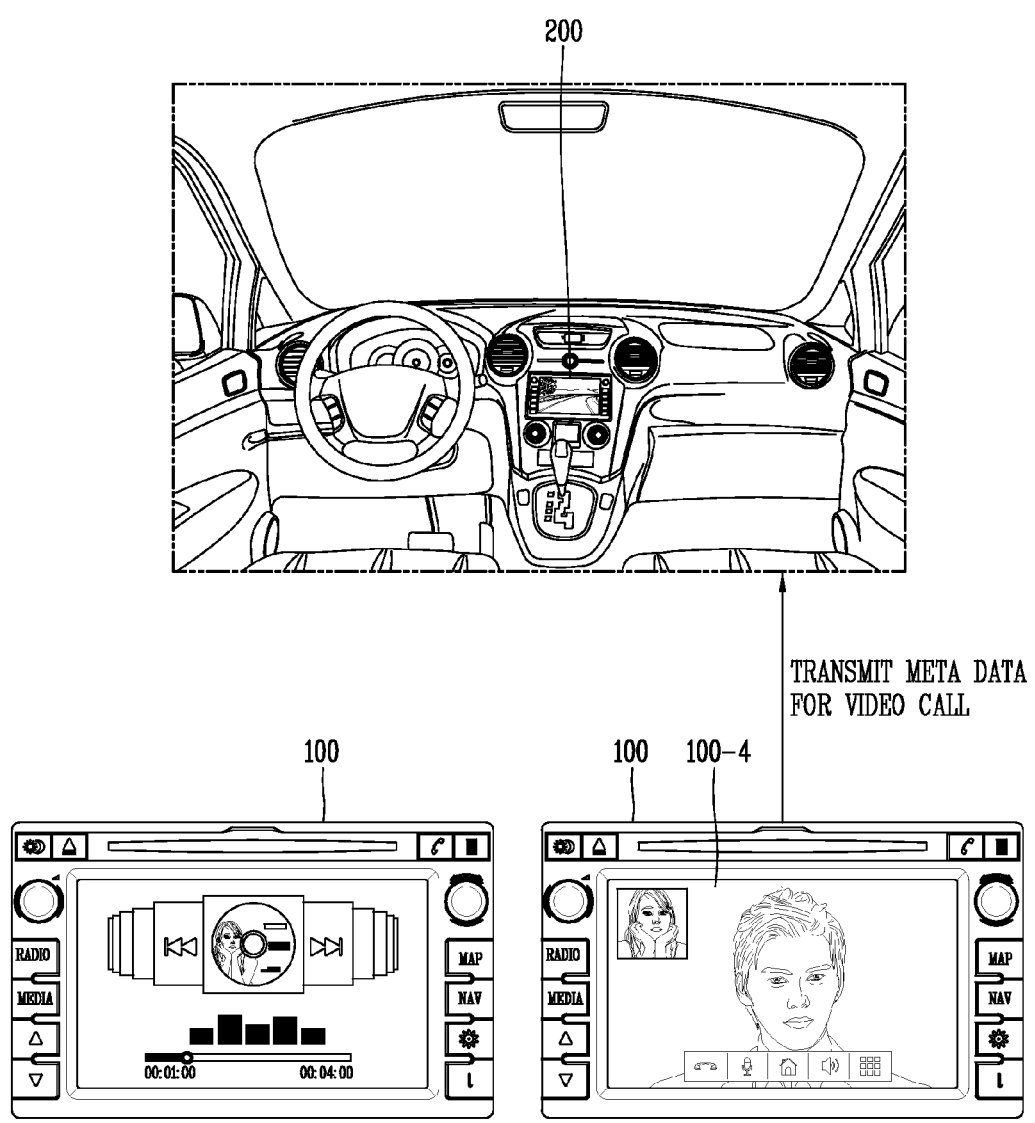
FIG. 11 is an exemplary view illustrating terminals to which an information providing apparatus according to a fourth embodiment of the present disclosure is applied.

FIG. 11 is an exemplary view illustrating terminals to which an information providing apparatus according to a fourth embodiment of the present disclosure is applied.

Figure 12:
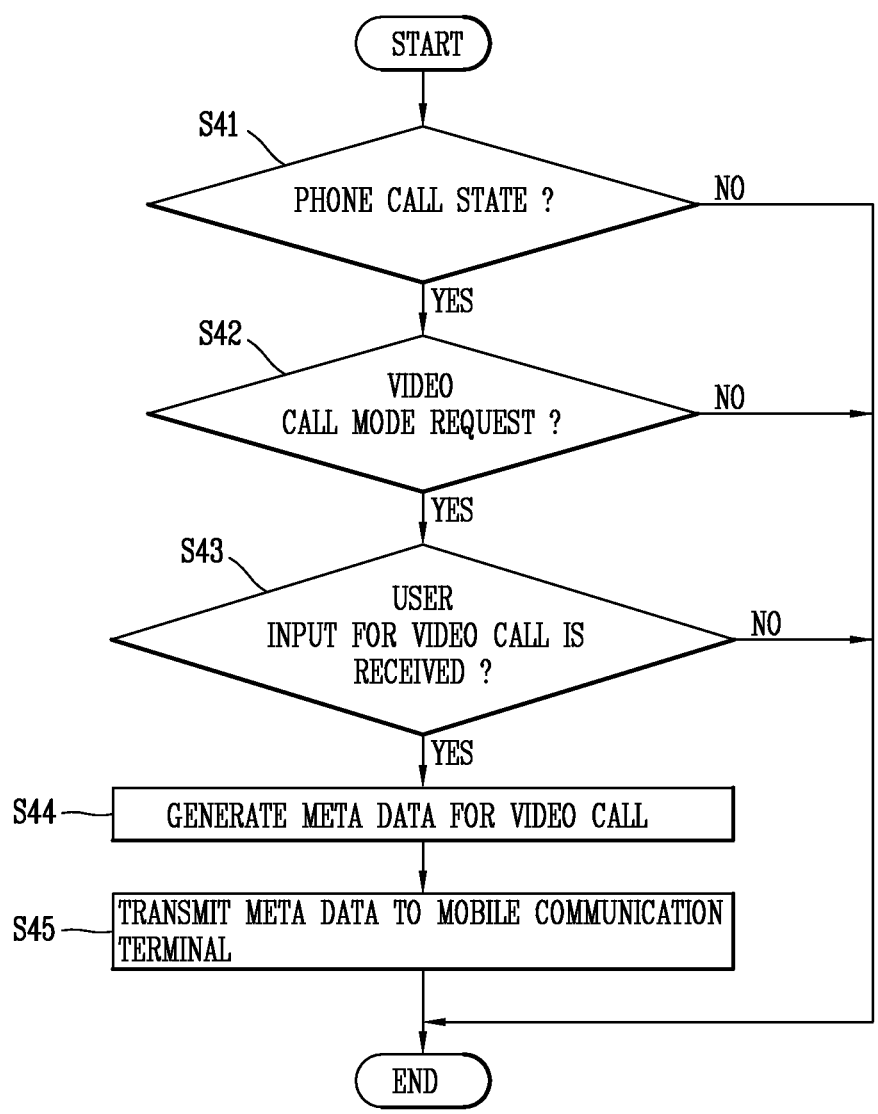
FIG. 12 is a flow chart illustrating an information providing method according to a fourth embodiment of the present disclosure.

FIG. 12 is a flow chart illustrating an information providing method according to a fourth embodiment of the present disclosure.

First, the telematics terminal 200 (for example, controller 212) determines whether or not it is in a phone call state (S41). For example, the telematics terminal 200 (for example, controller 212) determines whether or not the driver is in a phone call (voice call) state.

When the driver requests a video call mode in the phone call state (S42), the telematics terminal 200 (for example, controller 212) determines whether or not a user input for performing a video call through the mobile communication terminal 100 is received (S43). A user input for performing the video call through the mobile communication terminal 100 may be a specific button input, a voice command, a gesture, and the like.

When a user input for performing the video call through the mobile communication terminal 100 is received, the telematics terminal 200 (for example, controller 212) generates meta data for the video call (S44). The meta data for the video call may include application program information for performing a video call and request information for requesting the execution of an application program performing the video call.

When a vehicle is driven when the driver requests a video call mode in the phone call state, the telematics terminal 200 (for example, controller 212) may automatically generate meta data for the video call.

The telematics terminal 200 (for example, controller 212) transmits the meta data to the mobile communication terminal 100 through a wired or wireless communication network (S45).

The mobile communication terminal 100 receives the meta data, and automatically executes an application program 100-4 for performing the video call based on application program information and request information contained in the received meta data, thereby performing the video call instead of the telematics terminal 200 (for example, controller 212). For example, when the driver feels difficulty in performing a video call while driving a vehicle or is unable to perform a video call, the vehicle passenger (for example, family member, acquaintance, etc.) may perform a video call instead of the driver.

Accordingly, in an information providing apparatus and a method thereof according to a fourth embodiment of the present disclosure, the driver may transmit meta data for a video call during the phone call to the mobile communication terminal of the vehicle passenger, thereby allowing the vehicle passenger (for example, family member, acquaintance, etc.) to perform the video call instead of the driver when the driver feels difficulty in performing the video call while driving a vehicle or is unable to perform the video call.

Hereinafter, an information providing apparatus and a method thereof according to a fifth embodiment of the present disclosure capable of easily and effectively sharing (providing) information between a plurality of terminals will be described with reference to FIGS. 13 and 14.

Figure 13:
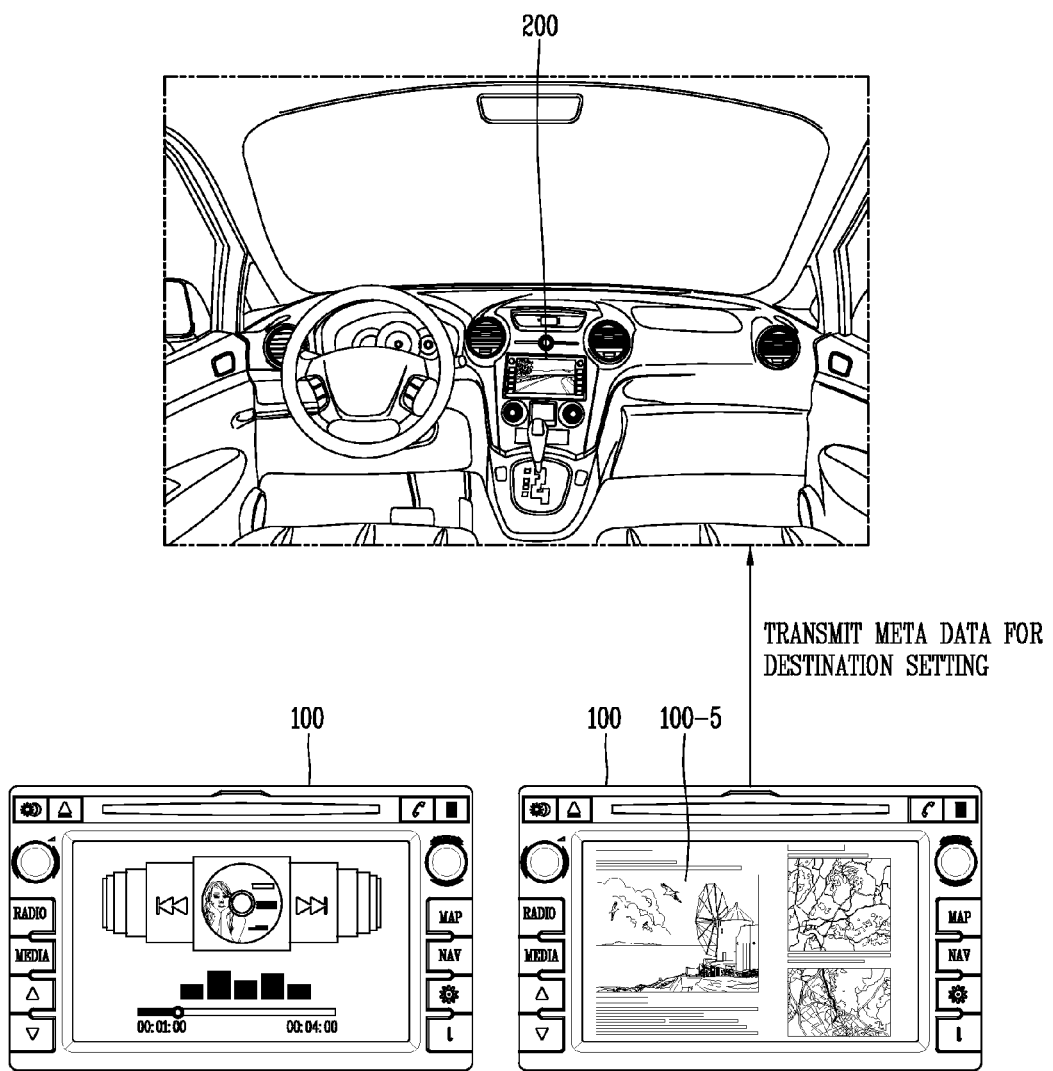
FIG. 13 is an exemplary view illustrating terminals to which an information providing apparatus according to a fifth embodiment of the present disclosure is applied.

FIG. 13 is an exemplary view illustrating terminals to which an information providing apparatus according to a fifth embodiment of the present disclosure is applied.

Figure 14:
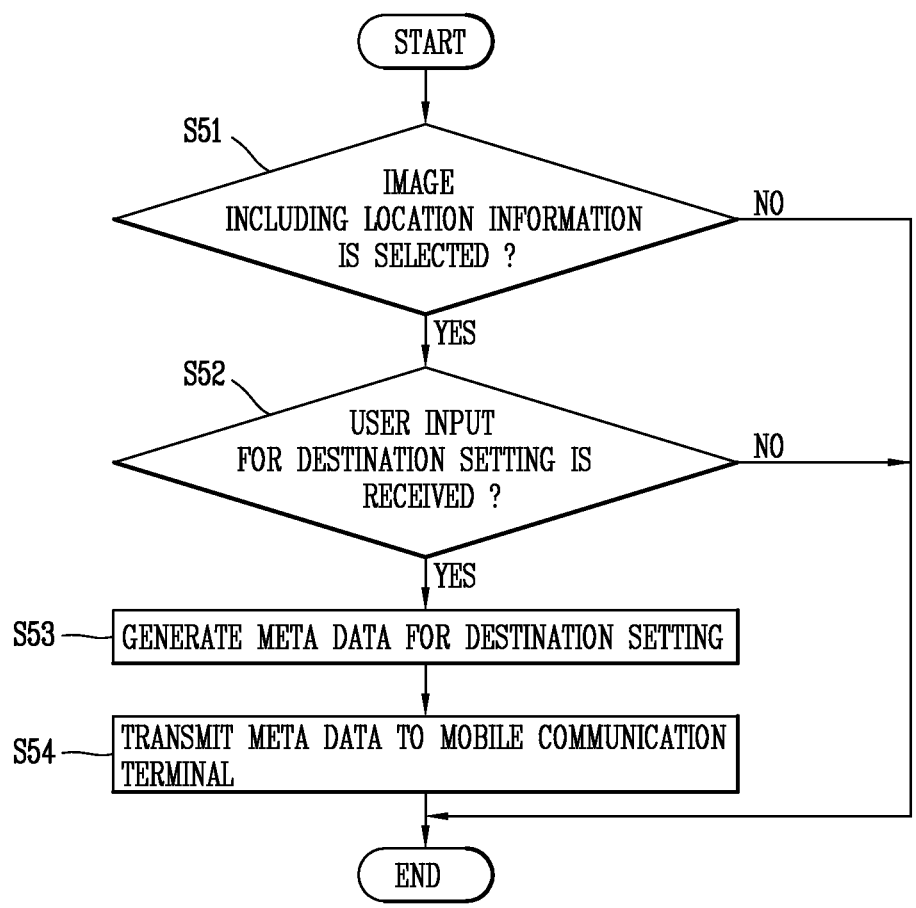
FIG. 14 is a flow chart illustrating an information providing method according to a fifth embodiment of the present disclosure.

FIG. 14 is a flow chart illustrating an information providing method according to a fifth embodiment of the present disclosure.

First, the mobile communication terminal 100 (for example, controller 180) determines whether or not an image 100-5 having location information is selected by the user (S51). For example, the mobile communication terminal 100 (for example, controller 180) displays a website on the display unit 151 according to the user's request, and determines whether or not the image (photo) 100-5 displayed on the website is selected by the user. The image (geo-tagged photo) may include location information.

The mobile communication terminal 100 (for example, controller 180) determines whether or not a user input for requesting to transmit location information contained in the image (geo-tagged photo) as destination information to the telematics terminal 200 (for example, controller 212) is received (S52). A user input for requesting to transmit location information contained in the image (photo) as destination information to the telematics terminal 200 (for example, controller 212) may be a specific button input, a voice command, a gesture, and the like.

When a user input for requesting to transmit location information contained in the image (photo) as destination information to the telematics terminal 200 (for example, controller 212) is received, the mobile communication terminal 100 (for example, controller 180) generates meta data for setting location information contained in the image (photo) to destination information (S53). The meta data for setting location information contained in the image (photo) to destination information may include request information for requesting location information contained in the image (photo) to be set to destination information, location information (for example, coordinate) contained in the image (photo), and format information indicating the format of the location information, and the like. The format information may be or may not be contained in the meta data.

The mobile communication terminal 100 (for example, controller 180) transmits the meta data to the telematics terminal 200 (for example, controller 212) through the communication unit 110 (S54). The telematics terminal 200 (for example, controller 212) may generate the meta data including the destination information and request information, and transmit the generated meta data to the mobile communication terminal 100 (for example, controller 180).

The telematics terminal 200 (for example, controller 212) receives the meta data from the mobile communication terminal 100 through a wired or wireless communication network, and configures a destination based on the destination information and request information contained in the received meta data. The telematics terminal 200 (for example, controller 212) may set the destination information to a destination or reject the destination setting based on the driver's request when the destination information is contained in the meta data.

Accordingly, in an information providing apparatus and a method thereof according to a fifth embodiment of the present disclosure, the vehicle passenger may transmit meta data including location information contained in his or her desired photo during the web surfing, thereby allowing the driver to conveniently and easily check a destination desired by the vehicle passenger, and automatically setting the destination desired by the vehicle passenger without the driver's manipulation.

Hereinafter, an information providing apparatus and a method thereof according to a sixth embodiment of the present disclosure capable of easily and effectively sharing (providing) information between a plurality of terminals will be described with reference to FIGS. 15 and 16.

Figure 15:
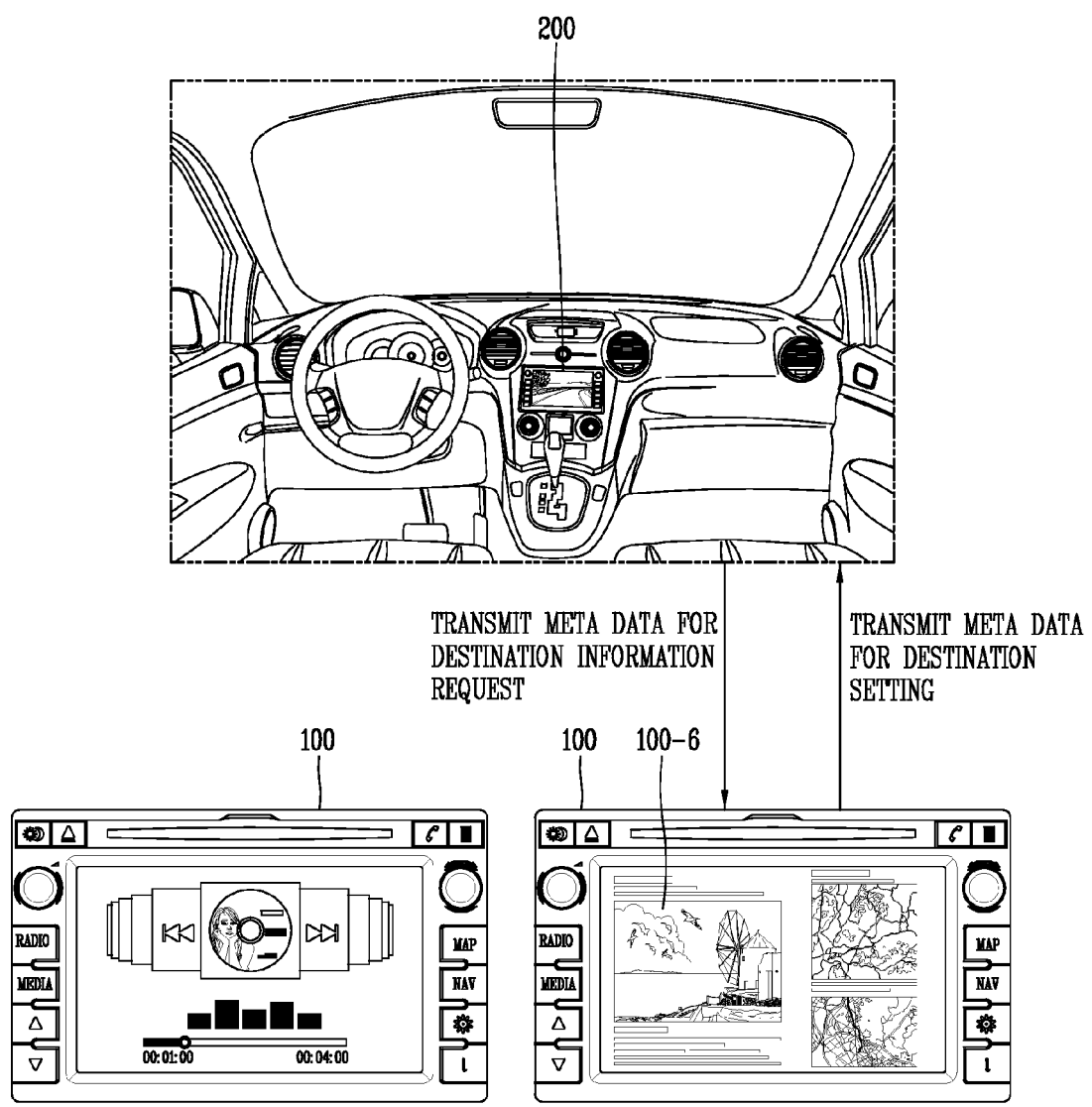
FIG. 15 is an exemplary view illustrating terminals to which an information providing apparatus according to a sixth embodiment of the present disclosure is applied.

FIG. 15 is an exemplary view illustrating terminals to which an information providing apparatus according to a sixth embodiment of the present disclosure is applied.

Figure 16:
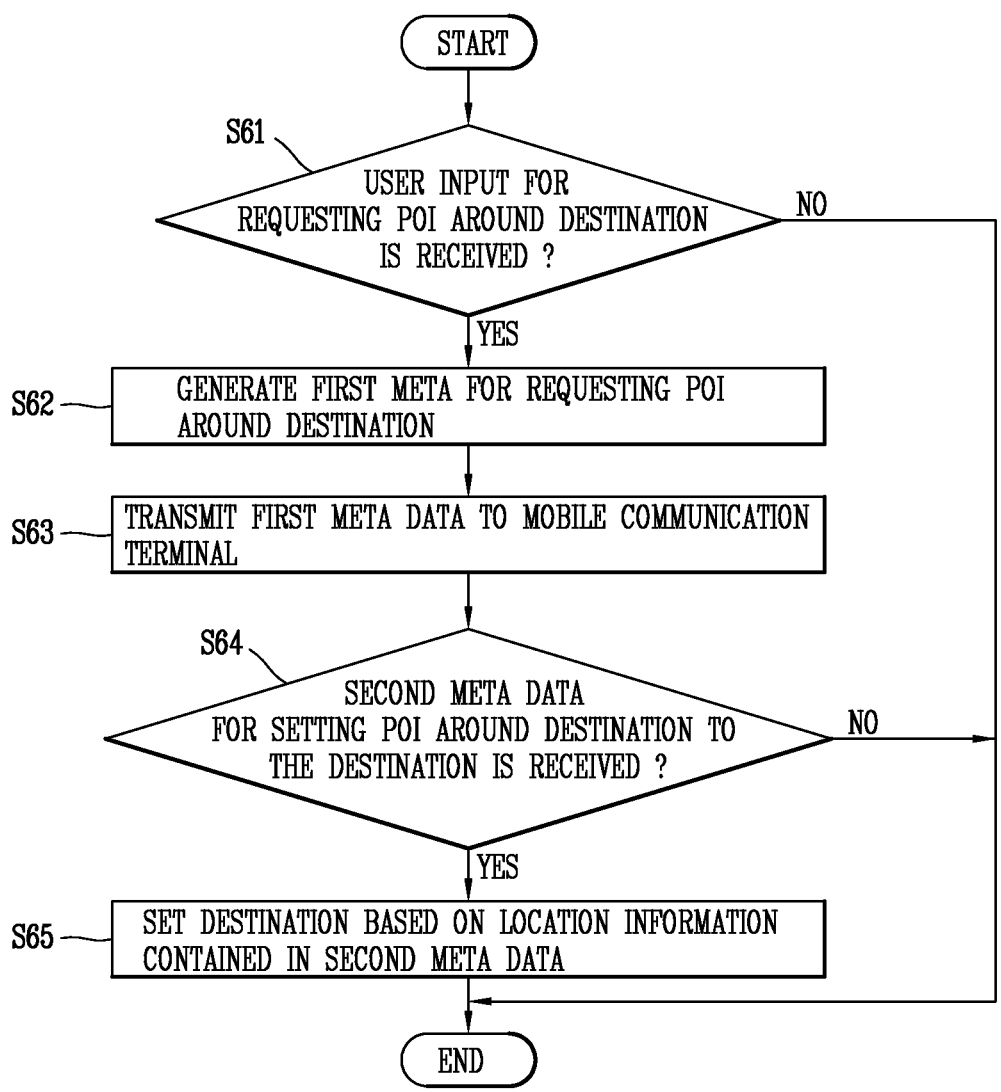
FIG. 16 is a flow chart illustrating an information providing method according to a sixth embodiment of the present disclosure.

FIG. 16 is a flow chart illustrating an information providing method according to a sixth embodiment of the present disclosure.

First, the telematics terminal 200 (for example, controller 212) determines whether or not a user input for requesting the nearby POI of the destination is received while guiding a path from the current location to the destination (S61). For example, the driver may request to retrieve the nearby POI of the destination to the mobile communication terminal 100 of the vehicle passenger since he or she feels difficulty in retrieving the nearby POI of the destination while driving a vehicle, and the vehicle passenger may retrieve the nearby POI of the destination through his or her own mobile communication terminal 100, and transmit the retrieval result as a destination to the telematics terminal 200 (for example, controller 212). A user input for requesting the nearby POI of the destination to the mobile communication terminal 100 may be a specific button input, a voice command, a gesture, and the like.

When a user input for requesting the nearby POI (for example, restaurant around the destination) of the destination is received, the telematics terminal 200 (for example, controller 212) generates first meta data requesting the nearby POI (for example, restaurant around the destination) of the destination (S62). The first meta data may include request information for requesting to retrieve the nearby POI (for example, restaurant around the destination) of the destination through a website, location information around the destination, and the nearby POI information (for example, restaurant) of the destination, and the like.

The telematics terminal 200 (for example, controller 212) transmits the first meta data to the mobile communication terminal 100 (S63).

The mobile communication terminal 100 (for example, controller 180) receives the first meta data, and automatically retrieves the nearby POIs (for example, restaurants around the destination) of the destination through the Internet network based on the first meta data, and displays the retrieved nearby POIs (for example, restaurants around the destination) of the destination on the display unit 151.

The mobile communication terminal 100 (for example, controller 180) determines whether or not a specific POI is selected by the user from the nearby POIs (for example, restaurants around the destination) of the destination displayed on the display unit 151. The nearby POIs (for example, restaurants around the destination) of the destination displayed on the display unit 151 may be images (geo-tagged photos) including location information. For example, the mobile communication terminal 100 (for example, controller 180) determines whether or not a specific photo is selected by the user from restaurant photos around the destination displayed on a website.

The mobile communication terminal 100 (for example, controller 180) determines whether or not the specific POI is selected, and a user input for requesting to transmit location information contained in the selected specific POI as destination information to the telematics terminal 200 (for example, controller 212) is received. A user input for requesting to transmit location information contained in the selected specific POI as destination information to the telematics terminal 200 (for example, controller 212) may be a specific button input, a voice command, a gesture, and the like.

When a user input for requesting to transmit location information contained in the selected specific POI as destination information to the telematics terminal 200 (for example, controller 212) is received, the mobile communication terminal 100 (for example, controller 180) generates second meta data for setting location information contained in the selected specific POI to destination information, and transmits the second meta data to the telematics terminal 200 (for example, controller 212). The second meta data may include request information for requesting location information contained in the selected specific POI to be set to destination information, location information (for example, coordinate) contained in the selected specific POI, and format information indicating the format of the location information, and the like. The format information may be or may not be contained in the meta data.

The telematics terminal 200 (for example, controller 212) determines whether or not second meta data for setting location information contained in the selected specific POI to destination information is received (S64).

When the second meta data is received, the telematics terminal 200 (for example, controller 212) automatically sets the selected specific POI to a destination based on the location information and request information contained in the received second meta data (S65).

Accordingly, in an information providing apparatus and a method thereof according to a sixth embodiment of the present disclosure, the driver may transmit meta data for requesting to retrieve the nearby POI of the destination to the mobile communication terminal 100 of the vehicle passenger, thereby allowing the driver to easily check the nearby POI of the destination while driving a vehicle, and automatically setting POI desired by the vehicle passenger as a destination without the driver's manipulation.

Hereinafter, an information providing apparatus and a method thereof according to a seventh embodiment of the present disclosure capable of easily and effectively sharing (providing) content (for example, application program, data, etc.) through a mirror link between a plurality of terminals will be described. The plurality of terminals may be homogeneous or heterogeneous terminals with respect to another.

Figure 17:
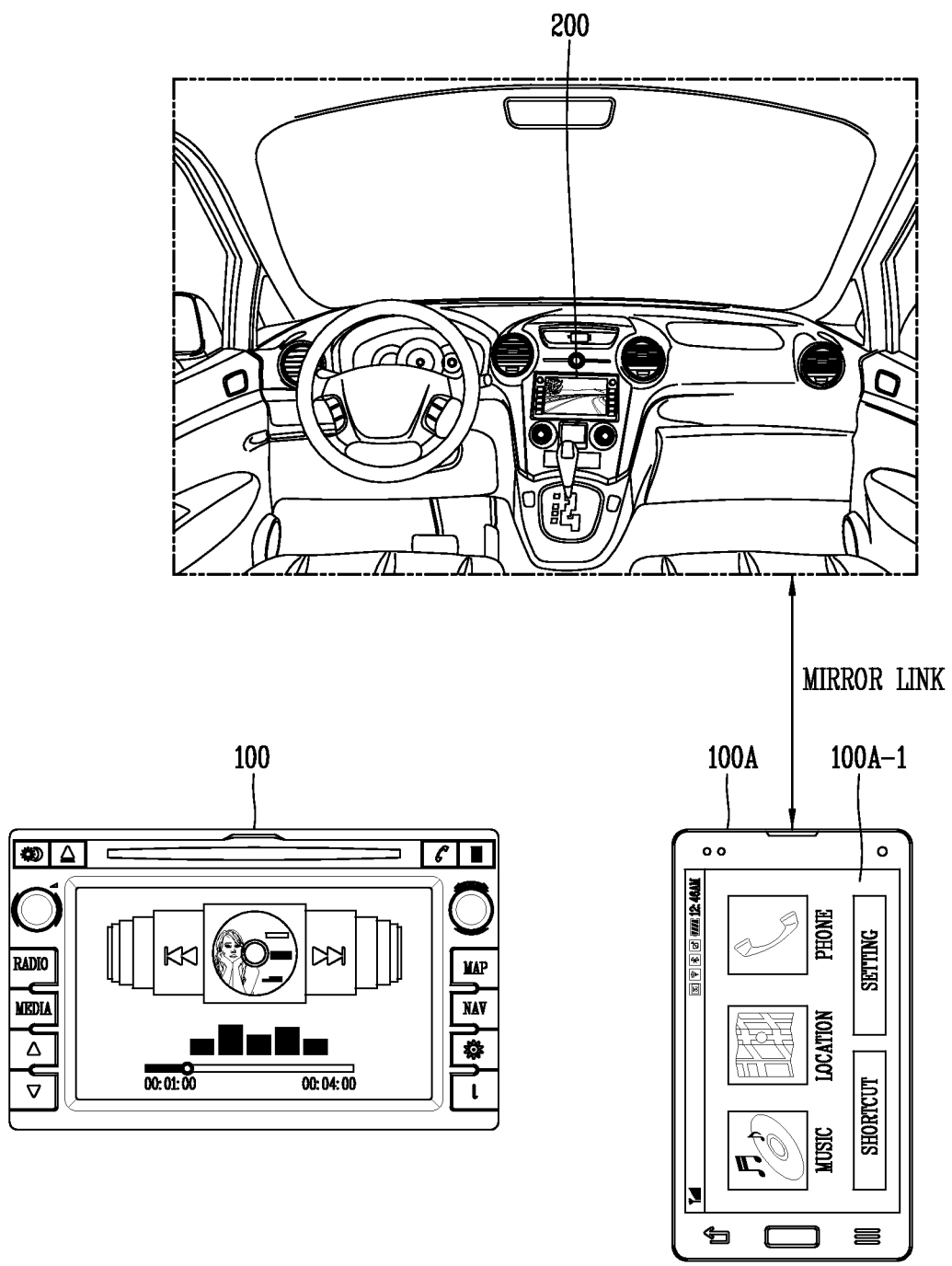
FIG. 17 is an exemplary view illustrating terminals to which an information providing apparatus according to a seventh embodiment of the present disclosure is applied.

FIG. 17 is an exemplary view illustrating terminals to which an information providing apparatus according to a seventh embodiment of the present disclosure is applied.

As illustrated in FIG. 17, the plurality of terminals may be configured with a telematics terminal (or head unit) 200 mounted on a vehicle and one or a plurality of mobile communication terminals 100, and the plurality of terminals may be connected to one another through a wireless or wired communication network. The telematics terminal 200 may be used by a vehicle driver, and one or more of the plurality of mobile communication terminals 100 may be used by a vehicle passenger or vehicle passengers.

A navigation apparatus 400 or mobile communication terminal 100 may be used instead of the telematics terminal 200. Instead of the plurality of mobile communication terminals 100, a plurality of rear seat entertainment systems (RSEs), portable phones, smart phones, notebook computers, digital broadcast terminals, personal digital assistants (PDAs), portable multimedia players (PMPs), tablet personal computers (PCs), and the like. Hereinafter, the telematics terminal 200 and plurality of mobile communication terminals 100 will be described for example.

The mobile communication terminal 100 and the telematics terminal 200 may be connected to each other through a wired or wireless network to form a virtual network computing (VNC) system. The VNC system may be formed to allow the user to control the mobile communication terminal 100 using the telematics terminal 200 or control the telematics terminal 200 using the mobile communication terminal 100.

When mirroring is requested from the telematics terminal 200 through a mirror link, the mobile communication terminal 100 transmits the display screen of the mobile communication terminal 100, namely, a screen image displayed on the 151 (for example, a screen image including content such as application programs (applications), music, video, a user interface (UI) image for vehicle, etc.) to the telematics terminal 200 on a wired or wireless connection through the communication unit 110 or interface 170.

The telematics terminal 200 displays a screen image received from the mobile communication terminal 100 on the display unit 201 provided within the telematics terminal 200. The telematics terminal 200 according to the present embodiment performs mirroring on the screen image of the mobile communication terminal 100 through a mirror link to display screen image received from the mobile communication terminal 100 on the display unit 201. In other words, screen images displayed on the display units 151, 201 of the mobile communication terminal 100 and the telematics terminal 200 may be the same (mirroring).

Hereinafter, an information providing method according to a seventh embodiment of the present disclosure will be described with reference to FIGS. 17 and 18.

Figure 18:
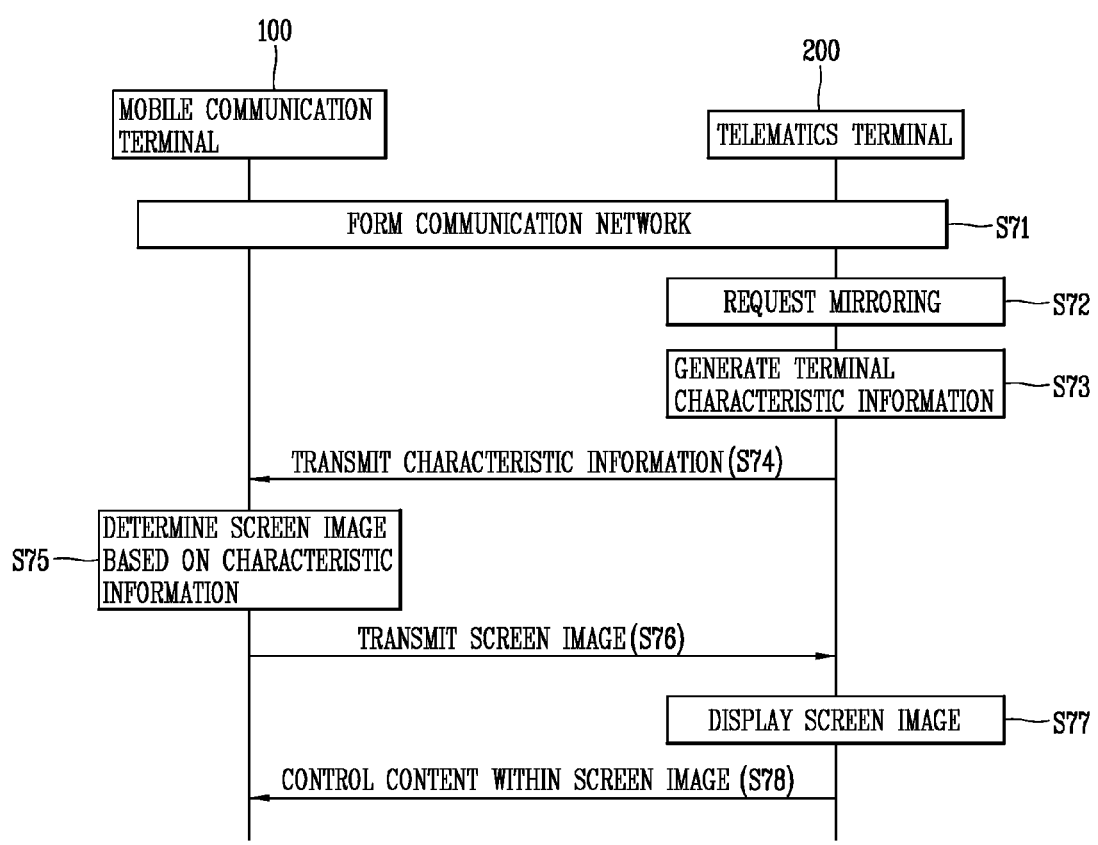
FIG. 18 is a flow chart illustrating an information providing method according to a seventh embodiment of the present disclosure.

FIG. 18 is a flow chart illustrating an information providing method according to a seventh embodiment of the present disclosure.

First, the telematics terminal 200 forms a communication network with the mobile communication terminal 100 (S71). The mobile communication terminal 100 may be a mobile communication terminal of the user who rides in a vehicle or a mobile communication terminal located at a remote place.

The telematics terminal 200 requests mirroring to the mobile communication terminal 100 through a mirror link (S72). For example, when a user input for requesting the mirroring is received, the telematics terminal 200 requests mirroring to the mobile communication terminal 100. A user input for requesting the mirroring may be a specific button input, a voice command, a gesture, and the like.

The telematics terminal 200 generates characteristic information (terminal characteristic information) when requesting mirroring to the mobile communication terminal 100 through a mirror link (S73), and transmits the generated characteristic information to the mobile communication terminal 100 (S74). The characteristic information (terminal characteristic information) as information indicating whether or not the telematics terminal 200 is subject to driving regulation may indicate whether or not to execute an application program subject to driving regulation or the like.

The mobile communication terminal 100 receives the characteristic information from the telematics terminal 200, and determines a screen image 100A-1 to be displayed on the display unit 201 of the telematics terminal 200 based on the characteristic information (S75). The screen image 100-1 may be a screen image including content such as application programs excluded from the driving regulation object, an image user interface (UI) for vehicle, and the like. For example, when the characteristic information is information indicating that the telematics terminal 200 is a terminal subject to driving regulation, the mobile communication terminal 100 selects (determines) a screen image (for example, screen image for vehicle) including one or more contents (for example, icons (thumbnail images) of application programs) excluding contents (for example, application program(s)) corresponding to the driving regulation subject among the contents (for example, application programs) of the mobile communication terminal 100, and displays the selected screen image on the display unit 151 of the mobile communication terminal 100. The mobile communication terminal 100 transmits a screen image displayed on the display unit 151 to the telematics terminal 200 (S76).

When the characteristic information is information indicating that the telematics terminal 200 is a terminal subject to driving regulation, the mobile communication terminal 100 may reconfigure information (for example, size of the icon (for example, thumbnail image, button icon or the like of the application program) within the determined screen image to be matched to driving regulation, and transmit the reconfigured information to the telematics terminal 200.

The telematics terminal 200 displays a screen image transmitted from the mobile communication terminal 100 on the display unit 201 of the telematics terminal 200 (S77).

The telematics terminal 200 controls contents contained in the screen image displayed on the display unit 201 according to the user's request (S78). For example, when a specific content contained within the screen image displayed on the display unit 201 is executed by the user, the telematics terminal 200 executes the specific content displayed on the display unit 151 of the mobile communication terminal 100 through the mirror link.

When the characteristic information is information indicating that the telematics terminal 200 is not a terminal subject to driving regulation, the mobile communication terminal 100 selects (determines) a screen image including at least one or more contents from the contents of the mobile communication terminal 100 or a current screen image of the mobile communication terminal 100, and displays the selected screen image on the telematics terminal 200.

When the characteristic information is information indicating that the telematics terminal 200 is a terminal subject to driving regulation, the mobile communication terminal 100 may select an application program list (contents) including the remaining application programs (for example, music reproduction application programs, Internet application programs, photo application programs, etc.) excluding video application programs associated with digital multimedia broadcast (DMB) or the like that can distract the attention of the user who are driving a vehicle from the list of application programs stored in the mobile communication terminal 100, and display the selected application program list on the display unit 201 of the telematics terminal 200. In other words, the telematics terminal 200 may display an application program list received from the mobile communication terminal 100, thereby allowing the telematics terminal 200 and mobile communication terminal 100 to be mirrored through a mirror link.

Accordingly, in an information providing apparatus and a method thereof according to a seventh embodiment of the present disclosure, a screen image of the mobile communication terminal may be displayed on the telematics terminal through a mirror link according to whether or not it is subject to driving regulation, thereby allowing the user to control contents excluded from driving regulation subjects through the telematics terminal.

In an information providing apparatus and a method thereof according to a seventh embodiment of the present disclosure, a screen image of the mobile communication terminal frequently used by the user may be displayed on the telematics terminal through a mirror link, thereby allowing the user to easily and quickly control contents within the frequently used screen image of the mobile communication terminal through the telematics terminal.

Hereinafter, an information providing method according to an eighth embodiment of the present disclosure will be described with reference to FIGS. 19 and 20.

Figure 19:
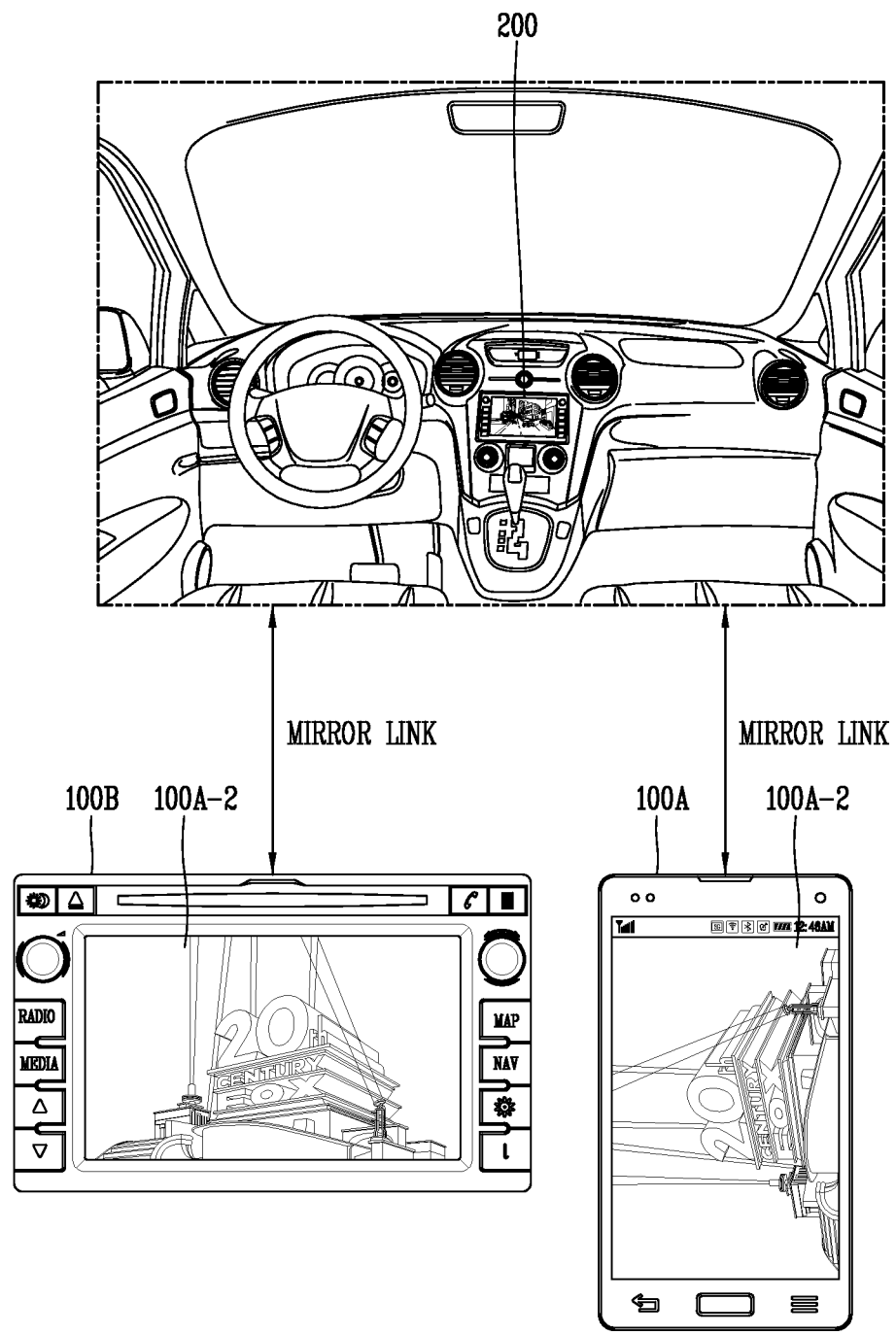
FIG. 19 is an exemplary view illustrating terminals to which an information providing apparatus according to an eighth embodiment of the present disclosure is applied.

FIG. 19 is an exemplary view illustrating terminals to which an information providing apparatus according to an eighth embodiment of the present disclosure is applied.

Figure 20:
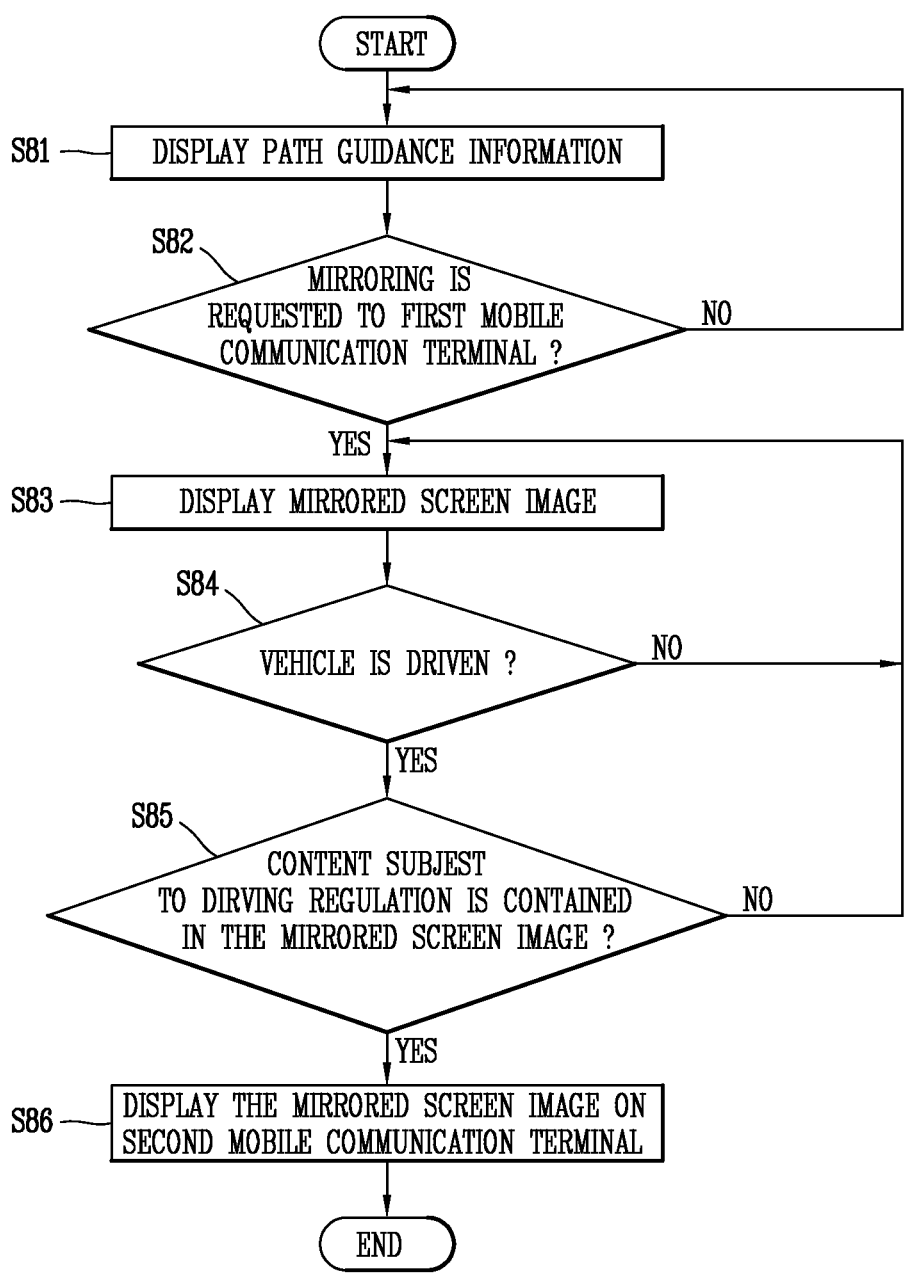
FIG. 20 is a flow chart illustrating an information providing method according to an eighth embodiment of the present disclosure.

FIG. 20 is a flow chart illustrating an information providing method according to an eighth embodiment of the present disclosure.

First, the telematics terminal 200 displays path guidance information from the current location to the destination on the display unit 201 (S81). The telematics terminal 200 may display the navigation information (path guidance information from the current location to the destination) of the mobile communication terminal 100 through a mirror link on the display unit 201.

The telematics terminal 200 requests mirroring to the first mobile communication terminal 100A through a mirror link (S82). For example, when a user input for requesting the mirroring is received, the telematics terminal 200 requests mirroring to the first mobile communication terminal 100A. A user input for requesting the mirroring may be a specific button input, a voice command, a gesture, and the like.

The telematics terminal 200 requests mirroring to the first mobile communication terminal 100A through the mirror link, thereby displaying the mirrored screen image 100A-2 on the display unit 201 (S83). For example, the telematics terminal 200 requests mirroring to the first mobile communication terminal 100A through the mirror link, thereby displaying the screen image (mirrored screen image 100A-2) of the first mobile communication terminal 100A on the display unit 201.

The telematics terminal 200 determines whether or not the vehicle is in a driving state while displaying the mirrored screen image 100A-2 on the display unit 201 (S84). For example, the telematics terminal 200 determines whether or not the vehicle is in a driving state based on the current location information.

When the vehicle is in a driving state while displaying the mirrored screen image 100A-2 on the display unit 201, the telematics terminal 200 determines whether or not content subject to driving regulation is contained in the mirrored screen image 100A-2 (S85). For example, when the vehicle is in a driving state while displaying the mirrored screen image 100A-2 on the display unit 201, the telematics terminal 200 determines whether or not content subject to driving regulation such as video (movie, drama, music video, etc.) is contained in the mirrored screen image 100A-2.

When the vehicle is in a driving state while displaying the mirrored screen image 100A-2 on the display unit 201, and content subject to driving regulation is contained in the mirrored screen image 100A-2, the telematics terminal 200 displays the mirrored screen image 100A-2 on a second mobile communication terminal 1008 connected to the telematics terminal 200 (S86).

When the vehicle is in a driving state while displaying the mirrored screen image 100A-2 on the display unit 201, and content subject to driving regulation is contained in the mirrored screen image 100A-2, the telematics terminal 200 displays the path guidance information on the display unit 201 while at the same time displaying the mirrored screen image 100A-2 on the second mobile communication terminal 1008.

The screen image 100A-2 of the first mobile communication terminal 100A may be displayed on the telematics terminal 200 and the second mobile communication terminal 1008 through a mirror link. Here, when the vehicle is in a driving state while displaying the screen image 100A-2 on the display unit 201, and content subject to driving regulation is contained in the screen image 100A-2, the telematics terminal 200 removes the screen image 100A-2 and displays the path guidance information on the display unit 201.

When a user input (for example, specific button input, a voice command, a gesture, etc.) for requesting to transmit the mirrored screen image 100A-2 to the second mobile communication terminal 1008 is received while requesting mirroring to the first mobile communication terminal 100A through the mirror link to display the mirrored screen image 100A-2 on the display unit 201, the telematics terminal 200 may display the mirrored screen image 100A-2 on the second mobile communication terminal 1008.

Accordingly, in an information providing apparatus and a method thereof according to an eighth embodiment of the present disclosure, it may be possible to determine whether or not content subject to driving regulation is contained in the screen image when a vehicle is in a driving state while displaying the screen image 100A-2, and display path guidance information instead of the screen image when the content subject to driving regulation is contained in the screen image, and display the screen image on the second mobile communication terminal 1008, thereby allowing the driver to conveniently and safely view the screen image while the vehicle is stopped, and concentrate on his or her driving while the vehicle is driven.

Hereinafter, an information providing method according to a ninth embodiment of the present disclosure will be described with reference to FIGS. 21 and 22.

Figure 21:
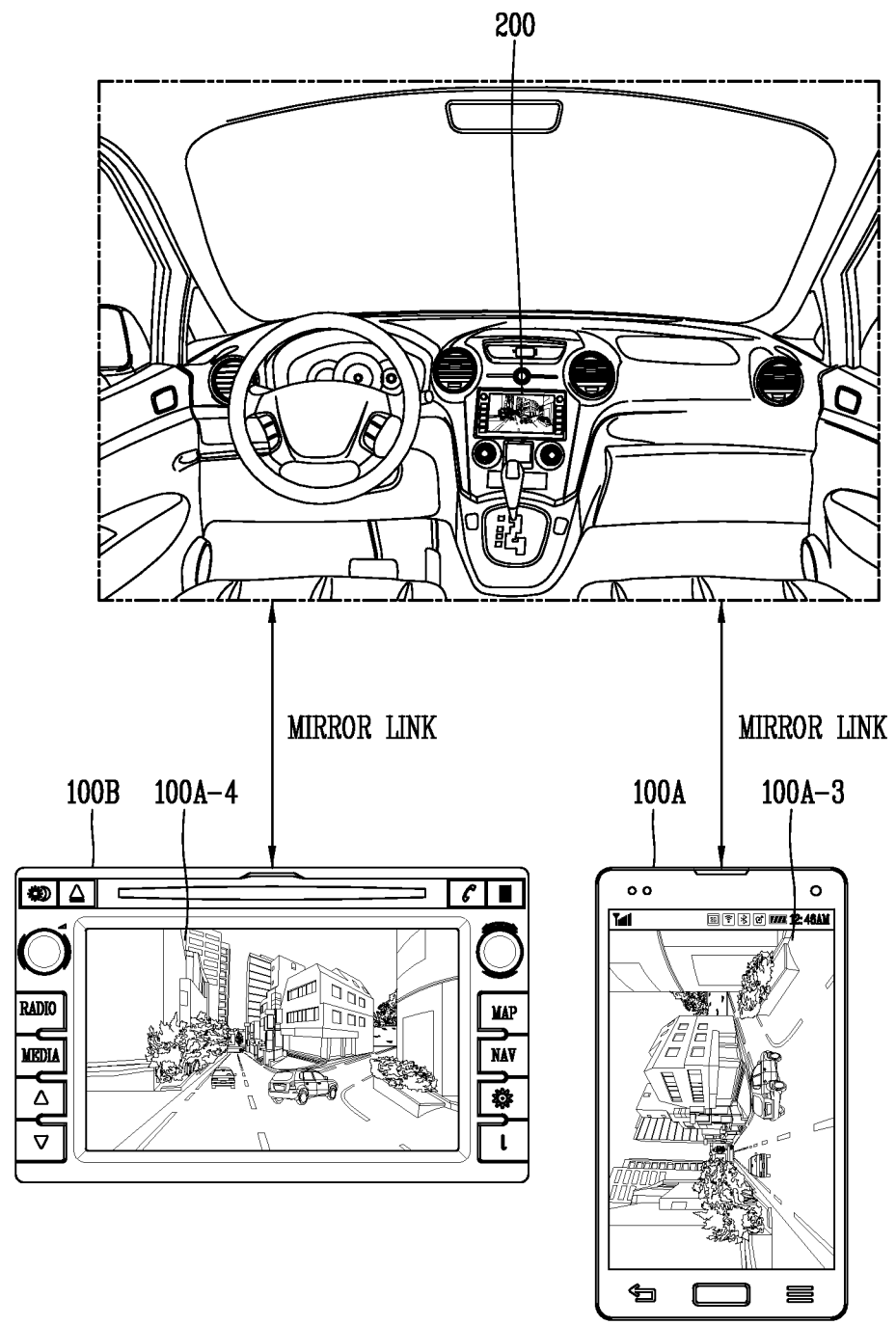
FIG. 21 is an exemplary view illustrating terminals to which an information providing apparatus according to a ninth embodiment of the present disclosure is applied.

FIG. 21 is an exemplary view illustrating terminals to which an information providing apparatus according to a ninth embodiment of the present disclosure is applied.

FIG. 22 is a flow chart illustrating an information providing method according to a ninth embodiment of the present disclosure.

First, the telematics terminal 200 displays a screen image including the navigation information (path guidance information from the current location to the destination) of the first mobile communication terminal 100A through a mirror link on the display unit 201 (S91). For example, the telematics terminal 200 requests mirroring to the first mobile communication terminal 100A through a mirror link to display the mirrored screen image 100A-3 on the display unit 201, and executes a navigation application program within the displayed screen image to display a screen image including the navigation information (path guidance information from the current location to the destination). The first mobile communication terminal 100A may be a mobile communication terminal of the user who rides in the vehicle or a mobile communication terminal of the driver.

The telematics terminal 200 determines whether or not a user input (for example, specific button input, a voice command, a gesture, etc.) for requesting destination information to the second mobile communication terminal 1008 is received while displaying the mirrored screen image 100A-3 including the navigation information (path guidance information from the current location to the destination) (S92).

When a user input for requesting destination information to the second mobile communication terminal 1008, the telematics terminal 200 transmits and displays the mirrored screen image 100A-3 including the navigation information (path guidance information from the current location to the destination) on the second mobile communication terminal 1008 (S93). For example, when the driver needs destination reconfiguration while driving a vehicle, the mirrored screen image 100A-3 may be displayed on the second mobile communication terminal 100B to allow the user of the second mobile communication terminal 100B to reconfigure the destination, thereby allowing the driver to prevent an accident due to careless driving in advance by destination reconfiguration and the like.

The second mobile communication terminal 100B selects a destination according to the user's selection on the mirrored screen image 100A-3 through the mirror link, and sets up the selected destination, and displays path guidance information from the current location to the set destination.

The second mobile communication terminal 1008 transmits a screen image 100A-4 including the displayed path guidance information to the telematics terminal 200 through the mirror link.

The telematics terminal 200 displays the screen image 100A-4 including the path guidance information displayed on the second mobile communication terminal 1008 on the display unit 201 (S94).

Accordingly, in an information providing apparatus and a method thereof according to a ninth embodiment of the present disclosure, when a user input for requesting a destination to the second mobile communication terminal is received while displaying a screen image including path guidance information through a mirror link on the display unit, the screen image including the path guidance information may be displayed on the second mobile communication terminal through the mirror link, thereby allowing the user to concentrate on his or her driving since destination setting is not required while driving a vehicle.

As described above in detail, in an information providing apparatus and a method thereof according to the embodiments of the present disclosure, data received from an external terminal may be automatically converted into a voice for output, thereby allowing the driver to easily and conveniently listen to data received from the external terminal as a voice while concentrating on his or her driving.

In an information providing apparatus and a method thereof according to the embodiments of the present disclosure, meta data including information related to audio-based content may be generated and transmitted while outputting the audio-based content (or photo, video-based content) such as music/radio through the audio output unit, thereby allowing the driver to easily and conveniently share music information being listened to with the vehicle passenger.

In an information providing apparatus and a method thereof according to the embodiments of the present disclosure, meta data for controlling a home network device may be transmitted to the mobile communication terminal of the vehicle passenger when the driver arrives in the vicinity of his or her home which is a destination, thereby allowing the passenger to quickly and safely control the home network device even during the vehicle driving (for example, during the parking) according to the driver's instruction while the driver parks a vehicle near his home.

In an information providing apparatus and a method thereof according to a embodiments of the present disclosure, the driver may transmit meta data for a video call during the phone call to the mobile communication terminal of the vehicle passenger, thereby allowing the vehicle passenger (for example, family member, acquaintance, etc.) to perform the video call instead of the driver when the driver feels difficulty in performing the video call while driving a vehicle or is unable to perform the video call.

In an information providing apparatus and a method thereof according to the embodiments of the present disclosure, the vehicle passenger may transmit meta data including location information contained in his or her desired photo during the web surfing, thereby allowing the driver to conveniently and easily check a destination desired by the vehicle passenger, and automatically setting the destination desired by the vehicle passenger without the driver's manipulation.

In an information providing apparatus and a method thereof according to the embodiments of the present disclosure, the driver may transmit meta data for requesting to retrieve the nearby POI of the destination to the mobile communication terminal 100 of the vehicle passenger, thereby allowing the driver to easily check the nearby POI of the destination while driving a vehicle, and automatically setting POI desired by the vehicle passenger as a destination without the driver's manipulation.

In an information providing apparatus and a method thereof according to the embodiments of the present disclosure, a screen image of the mobile communication terminal may be displayed on the telematics terminal through a mirror link according to whether or not it is subject to driving regulation, thereby allowing the user to control contents excluded from driving regulation subjects through the telematics terminal.

In an information providing apparatus and a method thereof according to the embodiments of the present disclosure, a screen image of the mobile communication terminal frequently used by the user may be displayed on the telematics terminal through a mirror link, thereby allowing the user to easily and quickly control contents within the frequently used screen image of the mobile communication terminal through the telematics terminal.

In an information providing apparatus and a method thereof according to the embodiments of the present disclosure, it may be possible to determine whether or not content subject to driving regulation is contained in the screen image when a vehicle is in a driving state while displaying the screen image of the first mobile communication terminal, and display path guidance information instead of the screen image when the content subject to driving regulation is contained in the screen image, and display the screen image on the second mobile communication terminal, thereby allowing the driver to conveniently and safely view the screen image while the vehicle is stopped, and concentrate on his or her driving while the vehicle is driven.

In an information providing apparatus and a method thereof according to the embodiments of the present disclosure, when a user input for requesting a destination to the second mobile communication terminal is received while displaying a screen image including path guidance information through a mirror link on the display unit, the screen image including the path guidance information may be displayed on the second mobile communication terminal through the mirror link, thereby allowing the user to concentrate on his or her driving since destination setting is not required while driving a vehicle.

It will be apparent to those skilled in this art that various changes and modifications may be made thereto without departing from the gist of the present invention. Accordingly, it should be noted that the embodiments disclosed in the present invention are only illustrative and not limitative to the concept of the present invention, and the scope of the concept of the invention is not limited by those embodiments. The scope protected by the present invention should be construed by the accompanying claims, and all the concept within the equivalent scope of the invention should be construed to be included in the scope of the right of the present invention.

What is claimed is:

1. An information providing apparatus, comprising:
a communication unit configured to transmit information and to receive first meta data from a mobile communication terminal;
a controller configured to execute an application program corresponding to application program information contained in the first meta data and process data contained in the first meta data via the executed application program, the application program executed based on the application program information; and
an output unit configured to output the processed data, wherein the controller is further configured to generate second meta data for controlling a home network device; and
control the communication unit to transmit the second meta data to the mobile communication terminal when a current location of the apparatus is near a specific destination.

2. The apparatus of claim 1, wherein the first meta data comprises:
location information related to the data;
application program information configured for processing the data; and
format information indicating a format of the data.

3. An information providing apparatus, comprising:
a communication unit configured to transmit information and to receive first meta data from a mobile communication terminal;
a controller configured to execute an application program corresponding to application program information contained in the first meta data and process data contained in the first meta data via the executed application program, the application program executed based on the application program information;
an output unit configured to output the processed data; and
a display unit configured to display information,
wherein the controller is further configured to:
control the display unit to display a website;
generate second meta data including text data from the website, information of an application program for reading the text data and format information indicating the text data upon receiving a user input that requests transmission of the website to the mobile communication terminal; and
control the communication unit to transmit the second meta data to the mobile communication terminal.

4. An information providing apparatus, comprising:
a communication unit configured to transmit information and to receive first meta data from a mobile communication terminal;
a controller configured to execute an application program corresponding to application program information contained in the first meta data and process data contained in the first meta data via the executed application program, the application program executed based on the application program information; and
an output unit configured to output the processed data,
wherein the controller is further configured to:
generate second meta data including information associated with audio-based content, storage information of the audio-based content and format information of the audio-based content; and
transmit the second meta data to the mobile communication terminal upon receiving a user input requesting transmission of the audio-based content to the mobile communication terminal while outputting the audio-based content.

5. The apparatus of claim 1, further comprising a display unit configured to display information and wherein the controller is further configured to:
automatically retrieve information associated with audio-based content contained in the first meta data; and
control the display unit to display the retrieved information.

6. An information providing apparatus, comprising:
a communication unit configured to transmit information and to receive first meta data from a mobile communication terminal;
a controller configured to execute an application program corresponding to application program information contained in the first meta data and process data contained in the first meta data via the executed application program, the application program executed based on the application program information; and
an output unit configured to output the processed data,
wherein the controller is further configured to:
generate second meta data related to a video call when a video call mode is requested during a call and a vehicle in which the apparatus is located is driven; and
control the communication unit to transmit the second meta data to the mobile communication terminal in order to perform the video call in the mobile communication terminal.

7. The apparatus of claim 6, wherein the second meta data comprises:
information associated with an application program for performing the video call; and
information for requesting execution of the application program for performing the video call.

8. An information providing apparatus, comprising:
a communication unit configured to transmit information and to receive first meta data from a mobile communication terminal;
a controller configured to execute an application program corresponding to application program information contained in the first meta data and process data contained in the first meta data via the executed application program, the application program executed based on the application program information; and an output unit configured to output the processed data, wherein the controller is further configured to:

generate second meta data for a video call when a user input for performing the video call via the mobile communication terminal is received with a request for a video call mode during a call; and control the communication unit to transmit the second meta data to the mobile communication terminal in order to perform the video call in the mobile communication terminal.

9. An information providing apparatus, comprising:

a communication unit configured to transmit information and to receive first meta data from a mobile communication terminal;

a controller configured to execute an application program corresponding to application program information contained in the first meta data and process data contained in the first meta data via the executed application program, the application program executed based on the application program information;

an output unit configured to output the processed data, and a display unit configured to display images and wherein the controller is further configured to:

generate second meta data including location information and information for requesting to set the location information as a destination when an image including the location information is selected from the display unit and a user input for requesting transmission of the location information to the mobile communication terminal as destination information is received; and control the communication unit to transmit the second meta data to the mobile communication terminal.

10. An information providing apparatus, comprising:

a communication unit configured to transmit information and to receive first meta data from a mobile communication terminal;

a controller configured to execute an application program corresponding to application program information contained in the first meta data and process data contained in the first meta data via the executed application program, the application program executed based on the application program information; and an output unit configured to output the processed data, wherein the controller is further configured to:

generate second meta data for requesting a point of interest (POI) around a specific destination in response to a user input;

control the communication unit to transmit the second meta data to the mobile communication terminal;

receive third meta data from the mobile communication terminal for requesting to set a location of the POI as a new destination; and automatically set the location of the POI as the new destination.

11. The apparatus of claim 1, wherein:

the output unit is a display unit;

the communication unit is further configured to receive a mirroring request and characteristic information of the mobile communication terminal, the mirroring request and characteristic information received from the mobile communication terminal via a mirror link; and the controller is further configured to:

determine a screen image to be displayed on the mobile communication terminal based on the characteristic information;

control the display unit to display the screen image; and control the mobile communication terminal to display the screen image.

12. The apparatus of claim 11, wherein the characteristic information indicates whether the mobile communication terminal is subject to a vehicle driving regulation.

13. The apparatus of claim 12, wherein the controller is further configured to control the display unit to display the screen image including information indicating at least one application program among a plurality of application programs in the mobile communication terminal other than an application program corresponding to the vehicle driving regulation when the characteristic information indicates that the mobile communication terminal is subject to the vehicle driving regulation.

14. The apparatus of claim 13, wherein the controller is further configured to control the display unit to display the screen image including a list of the plurality of application programs in the mobile communication terminal when the characteristic information indicates that the mobile communication terminal is not subject to the vehicle driving regulation.

15. An method of providing information for an information providing apparatus, the method comprising:

receiving first meta data from a mobile communication terminal;

executing an application program corresponding to application program information contained in the first meta data, the application program executed based on the application program information;

processing data contained in the first meta data via the application program;

outputting the processed data;

generating second meta data for controlling a home network device; and controlling the mobile communication unit to transmit the second meta data to the mobile communication terminal when a current location of the apparatus is near a specific destination.

16. The method of claim 15, wherein the first meta data comprises:

location information related to the data;

application program information for processing the data; and format information indicating a format of the data.

17. The method of claim 15, further comprising:

receiving a mirroring request and characteristic information of the mobile communication terminal, the mirroring request and characteristic information received from the mobile communication terminal via a mirror link;

determining a screen image to be displayed in the mobile communication terminal based on the characteristic information; and displaying the screen image on a display unit and in the mobile communication terminal, wherein the characteristic information indicates whether the mobile communication terminal is subject to a vehicle driving regulation.

18. The method of claim 17, further comprising:

displaying the screen image including information indicating at least one application program among a plurality of application programs in the mobile communication terminal other than an application program corresponding to the vehicle driving regulation when the characteristic information indicates that the mobile communication terminal is subject to the vehicle driving regulation.

19. The method of claim 18, further comprising:

displaying the screen image including a list of the plurality of application programs in the mobile communication terminal when the characteristic information indicates that the mobile communication terminal is not subject to the vehicle driving regulation.

\* \* \* \* \*